(12) United States Patent
Hamblin et al.

(10) Patent No.: US 12,068,461 B2
(45) Date of Patent: Aug. 20, 2024

(54) SYSTEMS AND METHODS FOR PROVIDING, ASSEMBLING, AND MANAGING INTEGRATED POWER BUS FOR RECHARGEABLE ELECTROCHEMICAL CELL OR BATTERY

(71) Applicant: Sion Power Corporation, Tucson, AZ (US)

(72) Inventors: Glenn Alan Hamblin, Tucson, AZ (US); David Warren Ribblett, Vail, AZ (US); Shea Thomas Ribblett, Vail, AZ (US); James Anthony Bock, Oro Valley, AZ (US); Mark Niedzwiecki, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 385 days.

(21) Appl. No.: 17/126,390

(22) Filed: Dec. 18, 2020

(65) Prior Publication Data

US 2021/0194069 A1 Jun. 24, 2021

Related U.S. Application Data

(60) Provisional application No. 62/951,206, filed on Dec. 20, 2019, provisional application No. 62/951,269, (Continued)

(51) Int. Cl.
*H01M 10/42* (2006.01)
*H01M 4/38* (2006.01)
(Continued)

(52) U.S. Cl.
CPC ....... *H01M 10/4257* (2013.01); *H01M 4/382* (2013.01); *H01M 10/052* (2013.01);
(Continued)

(58) Field of Classification Search
CPC ........... H01M 10/4257; H01M 10/655; H01M 10/667; H01M 10/052; H01M 10/486;
(Continued)

(56) References Cited

U.S. PATENT DOCUMENTS 5,648,187 A 7/1997 Skotheim
5,919,587 A 7/1999 Mukherjee et al.
(Continued)

FOREIGN PATENT DOCUMENTS

WO WO 2009/017726 A1 2/2009
WO WO 2009/042071 A2 4/2009
(Continued)

OTHER PUBLICATIONS

PCT/US2020/065907, Apr. 1, 2021, International Search Report and Written Opinion.
(Continued)

*Primary Examiner* — Nathaniel R Pelton
(74) *Attorney, Agent, or Firm* — Wolf, Greenfield & Sacks, P.C.

(57) ABSTRACT

A battery pack comprising a substrate comprising a battery power bus integrated into the substrate; and a pack controller; and at least one electrochemical cell connected directly to the substrate. A printed circuit board comprising a power bus integrated into the printed circuit board, wherein the power bus is connected to and configured to transfer power to and/or from at least one electrochemical cell; and at least one controller configured to control the at least one electrochemical cell. A thermal management system comprising at least one electrochemical cell; and a substrate directly connected to the at least one electrochemical cell and configured to transfer heat, power, and signals between the substrate and the at least one electrochemical cell. A thermal management method. A method of assembling a battery
(Continued)

pack, comprising attaching at least one electrochemical cell of the battery pack directly to a substrate at least in part by welding.

21 Claims, 17 Drawing Sheets

Related U.S. Application Data filed on Dec. 20, 2019, provisional application No. 62/951,262, filed on Dec. 20, 2019, provisional application No. 62/951,243, filed on Dec. 20, 2019.

(51) Int. Cl.
| | |
|---|---|
| *H01M 10/052* | (2010.01) |
| *H01M 10/48* | (2006.01) |
| *H01M 10/655* | (2014.01) |
| *H01M 10/667* | (2014.01) |
| *H02J 7/00* | (2006.01) |
| *H01M 4/02* | (2006.01) |

(52) U.S. Cl.
CPC ....... *H01M 10/486* (2013.01); *H01M 10/655* (2015.04); *H01M 10/667* (2015.04); *H02J 7/0019* (2013.01); *H02J 7/0047* (2013.01); H01M 2004/027 (2013.01); H01M 2010/4271 (2013.01); H01M 2010/4278 (2013.01)

(58) Field of Classification Search
CPC ........... H01M 4/382; H01M 2004/027; H01M 2010/4271; H01M 2010/4278; H02J 7/0019; H02J 7/0047
USPC ........................................................ 320/134
See application file for complete search history.

(56) References Cited

U.S. PATENT DOCUMENTS

| | | | |
|---|---|---|---|
| 5,961,672 | A | 10/1999 | Skotheim et al. |
| 6,238,821 | B1 | 5/2001 | Mukherjee et al. |
| 6,733,924 | B1 | 5/2004 | Skotheim et al. |
| 6,797,428 | B1 | 9/2004 | Skotheim et al. |
| 6,936,381 | B2 | 8/2005 | Skotheim et al. |
| 7,247,408 | B2 | 7/2007 | Skotheim et al. |
| 7,688,075 | B2 | 3/2010 | Kelley et al. |
| 7,771,870 | B2 | 8/2010 | Affinito et al. |
| 7,785,730 | B2 | 8/2010 | Affinito et al. |
| 7,939,198 | B2 | 5/2011 | Mukherjee et al. |
| 8,076,024 | B2 | 12/2011 | Affinito et al. |
| 8,084,102 | B2 | 12/2011 | Affinito |
| 8,087,309 | B2 | 1/2012 | Kelley et al. |
| 8,105,717 | B2 | 1/2012 | Skotheim et al. |
| 8,197,971 | B2 | 6/2012 | Skotheim et al. |
| 8,264,205 | B2 | 9/2012 | Kopera |
| 8,338,034 | B2 | 12/2012 | Affinito et al. |
| 8,415,054 | B2 | 4/2013 | Skotheim et al. |
| 8,603,680 | B2 | 12/2013 | Affinito et al. |
| 8,617,748 | B2 | 12/2013 | Mikhaylik et al. |
| 8,623,557 | B2 | 1/2014 | Skotheim et al. |
| 8,728,661 | B2 | 5/2014 | Skotheim et al. |
| 8,753,771 | B2 | 6/2014 | Skotheim et al. |
| 8,871,387 | B2 | 10/2014 | Wang et al. |
| 8,936,870 | B2 | 1/2015 | Affinito et al. |
| 8,968,928 | B2 | 3/2015 | Wang et al. |
| 9,005,311 | B2 | 4/2015 | Safont-Sempere et al. |
| 9,005,809 | B2 | 4/2015 | Wilkening et al. |
| 9,034,421 | B2 | 5/2015 | Mikhaylik et al. |
| 9,040,197 | B2 | 5/2015 | Affinito et al. |
| 9,040,201 | B2 | 5/2015 | Affinito et al. |
| 9,065,149 | B2 | 6/2015 | Skotheim et al. |
| 9,077,041 | B2 | 7/2015 | Burnside et al. |
| 9,105,938 | B2 | 8/2015 | Scordilis-Kelley et al. |
| 9,214,678 | B2 | 12/2015 | Mikhaylik |
| 9,397,342 | B2 | 7/2016 | Skotheim et al. |
| 9,419,274 | B2 | 8/2016 | Wilkening et al. |
| 9,490,478 | B2 | 11/2016 | Mikhaylik et al. |
| 9,531,009 | B2 | 12/2016 | Kumaresan et al. |
| 9,548,492 | B2 | 1/2017 | Affinito et al. |
| 9,559,348 | B2 | 1/2017 | Kumaresan et al. |
| 9,577,243 | B2 | 2/2017 | Schmidt et al. |
| 9,577,267 | B2 | 2/2017 | Scordilis-Kelley et al. |
| 9,653,735 | B2 | 5/2017 | Skotheim et al. |
| 9,653,750 | B2 | 5/2017 | Laramie et al. |
| 9,711,784 | B2 | 7/2017 | Kelley et al. |
| 9,728,768 | B2 | 8/2017 | Mikhaylik et al. |
| 9,735,411 | B2 | 8/2017 | Viner et al. |
| 9,755,268 | B2 | 9/2017 | Fleischmann et al. |
| 9,780,404 | B2 | 10/2017 | Scordilis-Kelley et al. |
| 9,825,328 | B2 | 11/2017 | Du et al. |
| 9,853,287 | B2 | 12/2017 | Mikhaylik et al. |
| 9,947,963 | B2 | 4/2018 | Du et al. |
| 9,994,959 | B2 | 6/2018 | Laramie et al. |
| 9,994,960 | B2 | 6/2018 | Laramie et al. |
| 10,020,479 | B2 | 7/2018 | Mikhaylik et al. |
| 10,020,512 | B2 | 7/2018 | Gronwald et al. |
| 10,050,308 | B2 | 8/2018 | Liao et al. |
| 10,069,135 | B2 | 9/2018 | Fleischmann et al. |
| 10,069,146 | B2 | 9/2018 | Skotheim et al. |
| 10,080,291 | B2* | 9/2018 | Neudecker ............. H01M 6/40 |
| 10,122,043 | B2 | 11/2018 | Du et al. |
| 10,243,202 | B2 | 3/2019 | Fleischmann et al. |
| 10,312,545 | B2 | 6/2019 | Scordilis-Kelley et al. |
| 10,319,988 | B2 | 6/2019 | Kelley et al. |
| 10,320,027 | B2 | 6/2019 | Scordilis-Kelley et al. |
| 10,320,031 | B2 | 6/2019 | Mikhaylik et al. |
| 10,333,134 | B2 | 6/2019 | Mikhaylik et al. |
| 10,333,149 | B2 | 6/2019 | Affinito et al. |
| 10,388,987 | B2 | 8/2019 | Du et al. |
| 10,461,333 | B2 | 10/2019 | Mikhaylik et al. |
| 10,461,372 | B2 | 10/2019 | Laramie et al. |
| 10,490,796 | B2 | 11/2019 | Laramie et al. |
| 10,535,902 | B2 | 1/2020 | Laramie et al. |
| 10,541,448 | B2 | 1/2020 | Mikhaylik et al. |
| 10,553,893 | B2 | 2/2020 | Laramie et al. |
| 10,573,869 | B2 | 2/2020 | Mikhaylik et al. |
| 10,608,278 | B2 | 3/2020 | Liao et al. |
| 10,629,947 | B2 | 4/2020 | Affinito et al. |
| 10,629,954 | B2 | 4/2020 | Mikhaylik et al. |
| 10,720,648 | B2 | 7/2020 | Quero-Mieres et al. |
| 10,847,833 | B2 | 11/2020 | Bunte et al. |
| 10,862,105 | B2 | 12/2020 | Gronwald et al. |
| 10,868,306 | B2 | 12/2020 | Mudalige et al. |
| 10,879,527 | B2 | 12/2020 | Laramie et al. |
| 2005/0196672 | A1 | 9/2005 | Mukherjee et al. |
| 2006/0115579 | A1 | 6/2006 | Mukherjee et al. |
| 2006/0238203 | A1 | 10/2006 | Kelley et al. |
| 2007/0221265 | A1 | 9/2007 | Affinito et al. |
| 2007/0224502 | A1 | 9/2007 | Affinito et al. |
| 2008/0187663 | A1 | 8/2008 | Affinito |
| 2008/0318128 | A1 | 12/2008 | Simoneau et al. |
| 2009/0035646 | A1 | 2/2009 | Mikhaylik et al. |
| 2009/0055110 | A1 | 2/2009 | Kelley et al. |
| 2009/0200986 | A1 | 8/2009 | Kopera |
| 2010/0035128 | A1 | 2/2010 | Scordilis-Kelley et al. |
| 2010/0129699 | A1 | 5/2010 | Mikhaylik et al. |
| 2010/0239914 | A1 | 9/2010 | Mikhaylik et al. |
| 2011/0006738 | A1 | 1/2011 | Mikhaylik et al. |
| 2011/0014524 | A1 | 1/2011 | Skotheim et al. |
| 2011/0059361 | A1 | 3/2011 | Wilkening et al. |
| 2011/0068001 | A1 | 3/2011 | Affinito et al. |
| 2011/0070491 | A1 | 3/2011 | Campbell et al. |
| 2011/0070494 | A1 | 3/2011 | Campbell et al. |
| 2011/0076560 | A1 | 3/2011 | Scordilis-Kelley et al. |
| 2011/0159376 | A1 | 6/2011 | Skotheim et al. |
| 2011/0165471 | A9 | 7/2011 | Skotheim et al. |
| 2011/0206992 | A1 | 8/2011 | Campbell et al. |
| 2011/0256450 | A1 | 10/2011 | Campbell et al. |
| 2012/0048729 | A1 | 3/2012 | Mikhaylik et al. |
| 2012/0052339 | A1 | 3/2012 | Mikhaylik et al. |
| 2012/0070746 | A1 | 3/2012 | Mikhaylik et al. |
| 2012/0082872 | A1 | 4/2012 | Schmidt et al. |

(56) References Cited

U.S. PATENT DOCUMENTS

| | | |
|---|---|---|
| 2012/0082901 A1 | 4/2012 | Schmidt et al. |
| 2013/0316072 A1 | 11/2013 | Scordilis-Kelley et al. |
| 2014/0272594 A1 | 9/2014 | Safont Sempere et al. |
| 2014/0272595 A1 | 9/2014 | Cristadoro et al. |
| 2015/0162586 A1 | 6/2015 | Fleischmann et al. |
| 2015/0188194 A1 | 7/2015 | Mikhaylik et al. |
| 2015/0287986 A1 | 10/2015 | Affinito et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2017/0141385 A1 | 5/2017 | Scordilis-Kelley et al. |
| 2017/0141402 A1 | 5/2017 | Affinito et al. |
| 2018/0006303 A1 | 1/2018 | Mikhaylik et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0301697 A1 | 10/2018 | Affinito et al. |
| 2018/0351148 A1 | 12/2018 | Schneider et al. |
| 2018/0351158 A1 | 12/2018 | Liao et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0267632 A1 | 8/2019 | Affinito et al. |
| 2019/0305281 A1* | 10/2019 | Hale ................... H01M 50/253 |
| 2019/0348672 A1 | 11/2019 | Wang et al. |
| 2019/0355954 A1* | 11/2019 | Dawley ............... H01M 50/522 |
| 2019/0386334 A1 | 12/2019 | Scordilis-Kelley et al. |
| 2020/0044460 A1 | 2/2020 | Mikhaylik et al. |
| 2020/0091547 A1 | 3/2020 | Scordilis-Kelley et al. |
| 2020/0099108 A1 | 3/2020 | Laramie et al. |
| 2020/0119324 A1 | 4/2020 | Laramie et al. |
| 2020/0185764 A1 | 6/2020 | Liao et al. |
| 2020/0194822 A1 | 6/2020 | Laramie et al. |
| 2020/0220146 A1 | 7/2020 | Laramie et al. |
| 2020/0220149 A1 | 7/2020 | Laramie |
| 2020/0220197 A1 | 7/2020 | Laramie et al. |
| 2020/0220205 A1 | 7/2020 | Affinito et al. |
| 2020/0227785 A1 | 7/2020 | Mikhaylik et al. |
| 2020/0243824 A1 | 7/2020 | Wang et al. |
| 2020/0259341 A1 | 8/2020 | Mikhaylik et al. |
| 2020/0313225 A1 | 10/2020 | Scordilis-Kelley et al. |
| 2020/0333194 A1* | 10/2020 | Huh ..................... G01R 31/374 |
| 2020/0350631 A1 | 11/2020 | Mikhaylik et al. |
| 2020/0358053 A1* | 11/2020 | Sauerteig ............ H01M 50/557 |
| 2020/0373551 A1 | 11/2020 | Milobar et al. |
| 2020/0373578 A1 | 11/2020 | Wang et al. |
| 2020/0395585 A1 | 12/2020 | Laramie et al. |
| 2021/0159710 A1* | 5/2021 | Furukawa ............. H01M 10/48 |
| 2022/0223949 A1* | 7/2022 | Masumori ........... H01M 50/183 |

FOREIGN PATENT DOCUMENTS

| | | |
|---|---|---|
| WO | WO 2009/054987 A1 | 4/2009 |
| WO | WO 2009/089018 A2 | 7/2009 |
| WO | WO2018132911 * | 7/2018 |

OTHER PUBLICATIONS

International Search Report and Written Opinion for International Application No. PCT/US2020/065907 mailed Apr. 1, 2021.

* cited by examiner

SYSTEMS AND METHODS FOR PROVIDING, ASSEMBLING, AND MANAGING INTEGRATED POWER BUS FOR RECHARGEABLE ELECTROCHEMICAL CELL OR BATTERY

RELATED APPLICATIONS

This application claims priority under 35 U.S.C. 119(e) to U.S. Provisional Application No. 62/951,206, filed Dec. 20, 2019, and entitled "Systems and Methods for Providing, Assembling, and Managing Integrated Power Bus for Rechargeable Electrochemical Cell or Battery", and to U.S. Provisional Application No. 62/951,243, filed Dec. 20, 2019, and entitled "Printed Circuit Board with Integrated Power Bus for Rechargeable Electrochemical Cell or Battery", and to U.S. Provisional Application No. 62/951,262, filed Dec. 20, 2019, and entitled "System and Method of Thermal Management for Rechargeable Electrochemical Cell, Battery, or Battery Pack", and to U.S. Provisional Application No. 62/951,269, filed Dec. 20, 2019, and entitled "Method of Assembling Battery Pack with Rechargeable Electrochemical Cell or Battery", each of which is incorporated herein by reference in its entirety.

TECHNICAL FIELD

Power buses for electrochemical cells, and related systems and methods, are generally described.

BACKGROUND

Conventionally, batteries have failed to compete successfully with established power sources such as combustion engines in various industries, such as vehicles. One reason for this failure has been that batteries have conventionally been too mass- and volume-inefficient.

SUMMARY

Disclosed herein are embodiments related to assembly and management of a power bus for electrochemical cells and related systems. The subject matter of the present invention involves, in some cases, interrelated products, alternative solutions to a particular problem, and/or a plurality of different uses of one or more systems and/or articles.

Some embodiments are directed to a battery pack. The battery pack may comprise a substrate comprising a battery power bus integrated into the substrate; and a pack controller; and at least one electrochemical cell connected directly to the substrate.

Some embodiments are directed to a printed circuit board comprising: a power bus integrated into the printed circuit board, wherein the power bus is connected to and configured to transfer power to and/or from at least one electrochemical cell; and at least one controller configured to control the at least one electrochemical cell.

Certain embodiments are directed to a thermal management system for a battery pack. The thermal management system may comprise at least one electrochemical cell of the battery pack; and a substrate directly connected to the at least one electrochemical cell and configured to transfer heat, power, and signals between the substrate and the at least one electrochemical cell.

Additional embodiments are directed to a method of thermal management for a battery pack. The method may comprise transferring heat, power, and signals between a substrate directly connected to at least one electrochemical cell of the battery pack and the at least one electrochemical cell.

Some embodiments are directed to a method of assembling a battery pack. The method may comprise attaching at least one electrochemical cell of the battery pack directly to a substrate at least in part by welding.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
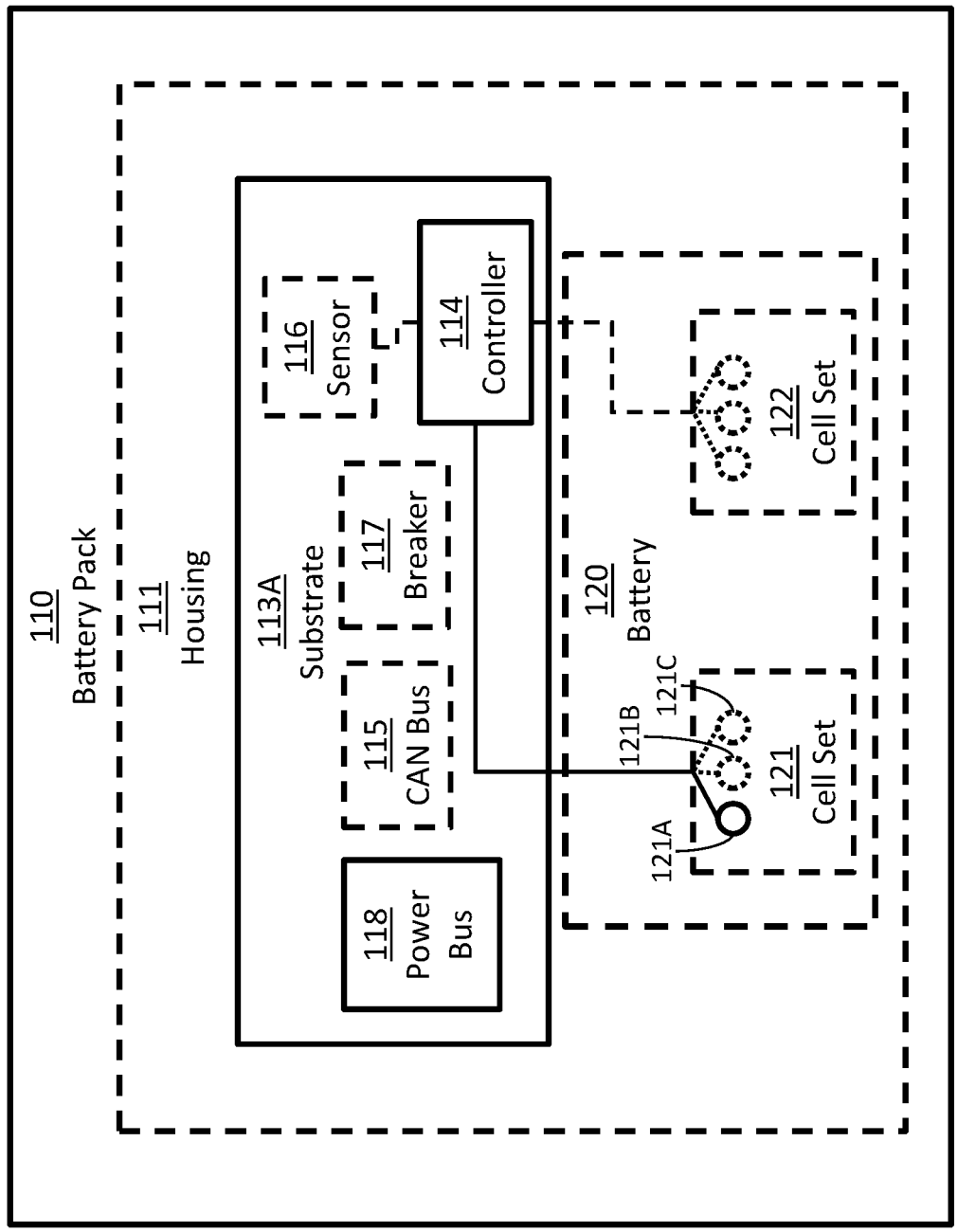
FIG. 1A is a block diagram illustrating a representative battery pack, according to some embodiments.

The inventors have recognized and appreciated that conventional structures and techniques for providing a power bus for electrochemical cells have resulted in overly mass- and volume-inefficient battery packs. Conventionally, battery cells are connected by bus bars, which then lead to a main power outlet to contacts for control. Each cell and control component then has wires (e.g., sense lines) that feed data to a battery management system (BMS) unit. The BMS unit then sends control signals to charge stations, vehicle ECU, and/or battery pack controls. The BMS unit also often has a main controller with one or more slave BMS units for increased channel count to monitor a battery pack system. A conventional power bus is separate in part because the copper traces must be so heavy to handle all the current required. These conventional arrangements have created battery packs and other electrochemical cell systems that are too mass- and volume-inefficient for many purposes, such as aerial vehicles.

The inventors have also recognized and appreciated that these and other conventional structures and techniques are more expensive, failure prone, dangerous, and noisy than necessary or than is desirable or acceptable for many purposes. For example, conventional systems have many wire/bus bar connections with great length, creating high part counts and complexity, and therefore high cost. Additionally, conventional systems have many connection points, creating many possible points or modes of failure. Moreover, having many separate components attached at these connection points creates safety issues from a user manipulation and vehicle interface isolation standpoint. In some situations, conventional attachments between battery cell tabs and board contacts can be improper or too weak even when proper, creating further failure risk and resulting dangers (such as fire). Furthermore, lengths of low and high power transportation create possible interference and noise issues, along with additional mass and cost inefficiencies.

The inventors have further recognized and appreciated that these and other issues with conventional system may be greatly mitigated and improved upon by providing a power bus integrated with a BMS unit. For example, integrating the power bus with the BMS unit may remove the need for wires and bus bar connections, especially with the length and complexity of conventional systems. Moreover, some embodiments may reduce the number of connection points and provide stronger, more proper attachments between battery cell tabs and board contacts.

The inventors have recognized and appreciated that, in accordance with certain embodiments, by reducing the amount of connections and materials, assembly may be faster and more automated, while also providing better quality and making end of line validation testing faster and more holistic.

Some embodiments herein may include low power effectors and controller(s), which may further increase power efficiency over conventional systems. The inventors have recognized and appreciated that, in accordance with certain embodiments, low power effectors and controller(s) may process and control BMS signals and control high power control circuits while still providing such benefits. In some embodiments, control systems may be largely but not entirely limited to digital components, while larger power components may include circuit breakers, contactors, and fusing elements. The inventors have recognized and appreciated that, in accordance with certain embodiments, the integration of such low and high power transportation with components and battery cells mounted directly may produce a system that is more mass- and volume-efficient than conventional systems.

Additionally, the inventors have recognized and appreciated that, in accordance with certain embodiments, the thermodynamic performance of conventional systems may also be improved upon by better utilizing and moving waste heat from the BMS unit or cells to improve the operating temperature of any component in the pack, which may be accomplished using some embodiments herein.

FIG. 1A depicts a representative battery pack 110. In some embodiments, representative battery pack 110 may include a pack controller (e.g., 114) and an electrochemical cell (e.g., 121A). In some embodiments, cell 121A may be present alone. In other embodiments, additional cells (e.g., optional cells 121B and 121C in FIG. 1A) and/or additional cell sets (e.g., optional cell set 122 in FIG. 1A in addition to cell set 121) may be present (e.g., to form battery 120). In some embodiments, the controller may include one or more processors, which may be of whatever complexity is suitable for the application. Alternatively or additionally, the controller may include an analog circuit and/or a less complex logic device than a processor or microprocessor.

In some embodiments, battery pack 110 may include a substrate (e.g., 113A), which may include a battery power bus (e.g., power bus 118) for the battery pack integrated into the substrate. For example, the battery power bus may be permanently physically attached to or embedded into the substrate, such that it cannot be detached without removing or deforming (e.g., plastically deforming) material between the battery power bus and the substrate. In some embodiments, the battery power bus may include copper that is physically part of the substrate. For example, the battery power bus may be plated on to the substrate like traces and component footprints, but with a much greater thickness (e.g., at least 0.3 millimeters in thickness).

In some embodiments, the controller may interact with the power bus by measuring cell or cell group voltages and/or power bus current. In some embodiments, the controller may interact with the power bus by balancing cells or cell groups (which may also be called "cell sets" herein), connecting/disconnecting the power bus to/from the load, and/or measuring power bus temperatures.

Figure 1B:
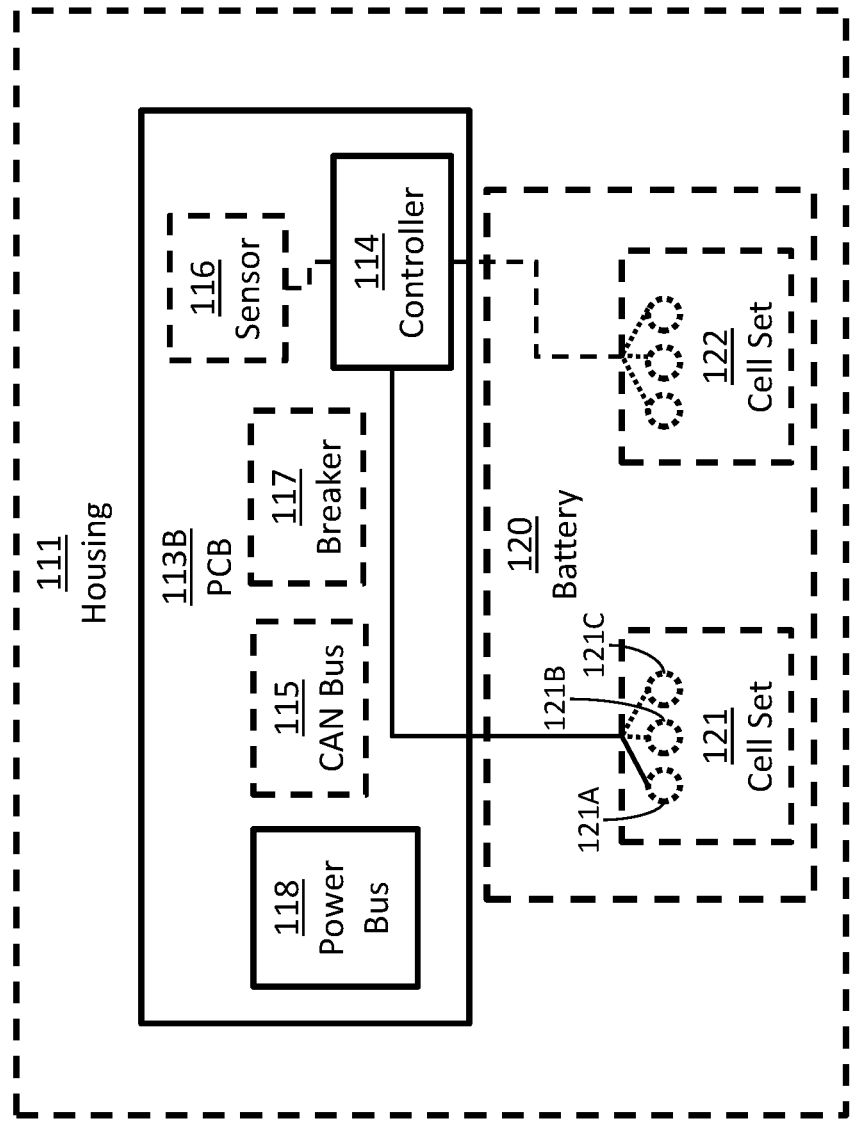
FIG. 1B is a block diagram illustrating a representative printed circuit board, according to some embodiments.

In some embodiments, the substrate may be or include a printed circuit board, such as further described in relation to FIG. 1B. In some embodiments, the substrate may include a controller area network (CAN) bus (e.g., 115) and at least one circuit breaker (e.g., 117), all in a single board. Additionally, the substrate may include at least one electrochemical cell terminal to which the cell(s) may be connected. For example, the cell terminal(s) may rise directly out of the substrate.

In some embodiments, the cell(s) may be connected directly to the substrate. In some embodiments, the substrate may be physically connected to the cell(s) (which could be one or any number of cells) without wires, such as via a physical connection between the cell(s) and the power bus. The inventors have recognized and appreciated that, in accordance with certain embodiments, using this physical connection instead of wires may reduce the connection distance (e.g., the distance may be just the distance between cells, instead of having to go up and through bus), thereby reducing resistance and resulting waste heat and other inefficiencies, such as voltage loss.

In some embodiments, a physical connection between the substrate (via the power bus or otherwise) and the cell(s) may provide heat transfer to and/or from the cell(s). In some embodiments, the physical connection between the substrate and the cell(s) may provide heat transfer directly between multiple cells, and/or directly between the cell(s) and the substrate in either direction. Examples of these heat transfers are described in relation to FIGS. 2A-2F. In some embodiments, a heat transfer pathway is created between the cell(s) themselves and between the substrate and the cell(s) along the tabs of the cell(s) (e.g., 160 in FIGS. 2A-2F) into the vias (e.g., 165) of the substrate.

In some embodiments, cell(s) may be connected to the substrate at least in part by laser welding. In some embodiments, this laser welding or another kind of welding or permanent attachment may create the physical connection that provides the heat transfer to and/or from the cell(s). For example, ultrasonic, friction, and/or resistance welding may be used in addition to or alternatively to laser welding (or any other precision metal connection technique) to create the physical connection. In some embodiments, the physical connection may be both electrically and thermally low-resistance. For example, the physical connection may have on average an electrical resistivity of $3*10^{-8}$ ohm-meters or less and a thermal conductivity of 200 watts per meter-kelvin or more.

Various materials may be used to create the physical connection, such as thermally and electrically conductive materials. In some embodiments, the material(s) used to create the physical connection may provide a heat flux of at least 1500 watts per square meter through the connection when the cell(s) have a temperature of 100 degrees Celsius and the substrate has a temperature of 25 degrees Celsius. In some embodiments, materials like copper, aluminum, and/or stainless steel may be used for the physical connection.

In some embodiments, battery pack 110 may include a housing in which the at least one electrochemical cell and the substrate are disposed. For example, FIGS. 2D-2F show some embodiments of a housing.

Optionally, battery pack 110 may include one or more sensors (e.g., 116). It should be appreciated that although only a single controller 114 and a single sensor 116 are shown in FIG. 1A, any suitable number of these components may be used. Any of numerous different modes of implementation may be employed.

In some embodiments, the controller may determine (e.g., using sensor 116) and/or communicate (e.g., using CAN bus 115) various information. Examples of this information include temperature information of the battery pack, voltage and/or current information of the cell(s) in the battery pack, balancing information of the battery pack, charging information of the battery pack, diagnostic information of the battery pack, and health information of the battery pack. The inventors have recognized and appreciate that, in accordance with certain embodiments, any of this various information may be more reliable due to it being obtained locally (e.g., on the single substrate) rather than sent from a remote location via wires.

In some embodiments, the power bus may include at least one layer of conductive material embedded in the substrate. In some embodiments, the layer(s) may be either or both thermally and electrically conductive. For example, the substrate may have embedded heavy copper inner layers, and, in some embodiments, heavy copper upper layers (e.g., the substrate may include up to 30 ounces of copper on each side). In some embodiments, the mass of the embedded inner layers (such as copper) may be between 10 and 30 ounces per square foot.

In some embodiments, the substrate itself may be thermally conductive. For example, the substrate may have a thermal conductivity of at least 200 watts per meter-kelvin, such as between 350 and 400 watts per meter-kelvin. The inventors have recognized and appreciated that, in accordance with certain embodiments, this may further improve heat management, including removal of waste heat and utilization of heat transfer where desirable. Thermal conductivity of the substrate and/or the power bus may be measured using any suitable method according to some embodiments, including steady-state methods and transient methods (such as the transient hot wire method).

In some embodiments, the cell(s) may include alignment features that allow the substrate to be fitted on top of the cell(s) and/or allow the cell(s) to be inserted into the substrate. In some embodiments, the substrate includes at least one opening into which at least a portion of the cell(s) are inserted. For example, tab(s) of the cell(s) may be pulled through the opening(s) or inserted into them. In some embodiments, the tabs may be straight along the same axis as the cells, and then bent or otherwise rotated or deformed to make contact with the substrate (see FIGS. 2A-2F for exemplary configurations and orientations of cells and tabs within a substrate).

In some embodiments, the controller may balance charge and/or discharge between multiple cells. For example, the controller may ensure that the cell(s) attain the same amount of charge and/or discharge using passive balancing operating and/or active balancing. In some embodiments, balancing may be performed "at top of charge" such that when a cell reaches maximum charge voltage, it may be bypassed so other cells in series with it come up to that voltage value. Alternatively or additionally, balancing may be performed at "bottom of charge" or any other suitable configuration.

In some embodiments, the controller may use active balancing, such as by taking charge from either the entire battery pack or a cell that has more charge and give it to cell(s) with less charge, which can be done at any point of a cycle.

According to some embodiments, the cell(s) may include at least one lithium-metal electrode active material. Additionally, each set of cells (e.g., cell set 121) may include one or more cells (e.g., 121A-121C). In some embodiments, each set of cells may have a single cell. Alternatively, each set of cells may include multiple cells and may form a cell "block," or multiple sets of cells may together form a cell block. Additionally, each cell (either in a battery, all the batteries in a battery pack, or in a set of cells) or set of cells may utilize the same electrochemistry. That is to say, in some embodiments, each cell may make use of the same anode active material and the same cathode active material.

In some embodiments, such as embodiments having multiple cells, a multiplexing switch apparatus (not shown in FIG. 1A) may be included, such as described in relation to FIG. 3A below, and may include an array of switches. Additionally, the multiplexing switch apparatus may be connected to each set of cells and/or to each cell individually. In some embodiments, the controller, such as 114, may use the multiplexing switch apparatus to selectively discharge the cells or sets of cells. Alternatively or additionally, the controller may similarly selectively transfer heat, power, and/or signals directly between multiple cells, and/or directly between the cell(s) and the substrate in either direction.

FIG. 1B depicts a representative printed circuit board (PCB) 113B. In some embodiments, PCB 113B may include a controller (e.g., 114). In some embodiments, an electrochemical cell (e.g., 121A) may be included and may be connected to the PCB and/or the controller. In some embodiments, cell 121A may be present alone. In other embodiments, additional cells (e.g., optional cells 121B and 121C) and/or additional cell sets (e.g., optional cell set 122 in addition to cell set 121) may be present (e.g., to form battery 120). In some embodiments, the controller may be integrated into the PCB or may be attached. In some embodiments, the controller may control the cell(s), such as by controlling how and/or when they are charged, discharged, connected or disconnected, and so on. In some embodiments, the controller may include one or more processors (e.g., as described elsewhere herein).

In some embodiments, a power bus (e.g., 118) may be integrated into the PCB. In some embodiments, the power bus may be connected to the cell(s) and may transfer power to and/or from the cell(s). In some embodiments, the power bus may be physically connected to the cell(s) without wires (e.g., as described elsewhere herein). For example, multiple cells may each be connected directly to the PCB without wires, such as via the power bus integrated into the PCB. In some embodiments, the power bus may be connected to the cell(s) in an arrangement that suits the voltage, current, and connection requirements of a given application.

In some embodiments, a physical connection between the PCB and the cell(s) may provide heat transfer to and/or from the cell(s) (e.g., as described elsewhere herein). In some embodiments, additional bus material may be included to enhance thermal transfer and/or dissipation.

In some embodiments, the cell(s) may be connected to the PCB at least in part by laser welding. For example, one or more cells may be laser welded to the PCB by laser welding them to the power bus, which may be integrated into the PCB.

In some embodiments, the cell(s) and the PCB may be disposed in a housing (e.g., 111) (e.g., as described elsewhere herein).

In some embodiments, the controller may determine (e.g., using sensor 116) and/or communicate (e.g., using CAN bus 115) various information. Examples of this information include temperature information of the cell(s), voltage and/or current information of the cell(s), balancing information of the cell(s), charging information of the cell(s), diagnostic information of the cell(s), and health information of the cell(s) (e.g., as described elsewhere herein).

In some embodiments, the PCB may have at least one opening into which at least a portion of the cell(s) may be inserted (e.g., as described elsewhere herein).

In some embodiments, the PCB may include a CAN bus (e.g., 115) and at least one circuit breaker (e.g., 117) (e.g., as described elsewhere herein).

In some embodiments, the PCB may include at least one electrochemical cell terminal (e.g., as described elsewhere herein).

In some embodiments, the power bus may include at least one layer of conductive material embedded in the PCB (e.g., as described elsewhere herein).

In some embodiments, the cell(s) may include a lithium-metal electrode active material (e.g., as described elsewhere herein).

In some embodiments, the controller may balance charge and/or discharge between multiple cell(s) (e.g., as described elsewhere herein).

Figure 1C:
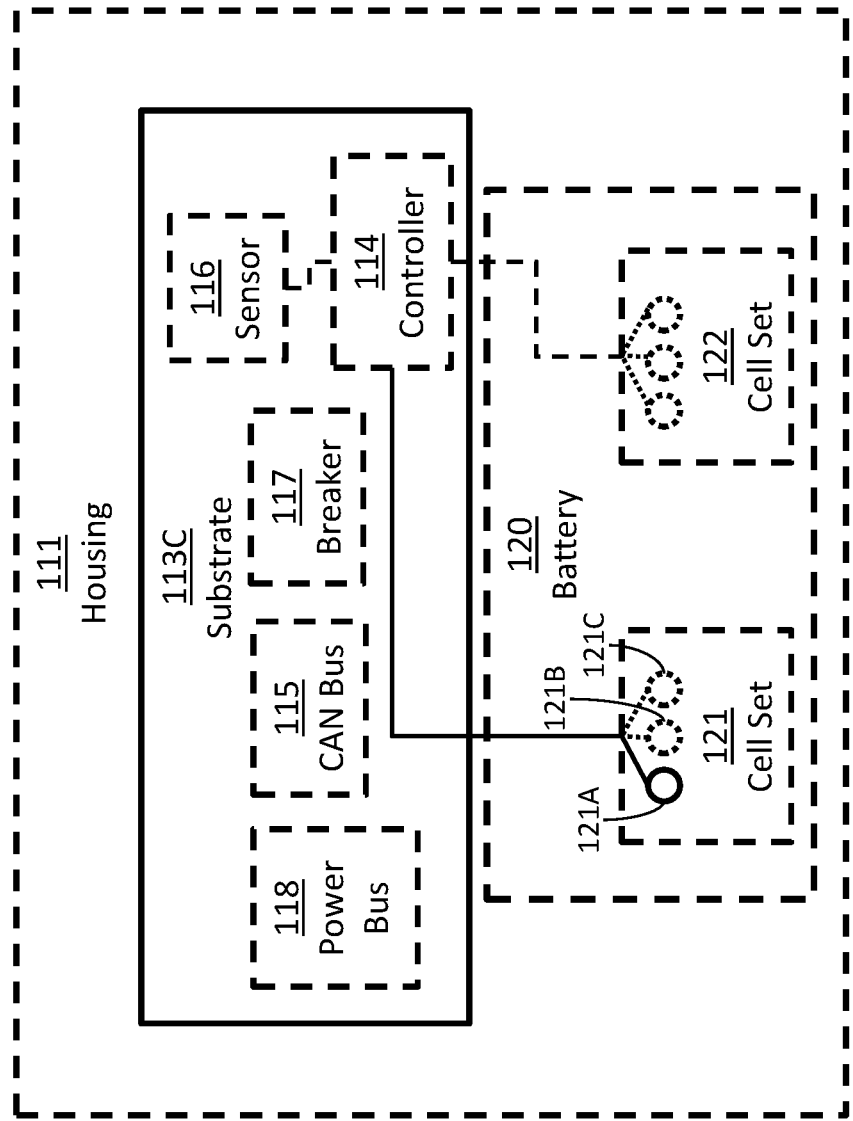
FIG. 1C is a block diagram illustrating a representative thermal management system for a battery pack, according to some embodiments.

FIG. 1C depicts a representative thermal management system for a battery pack. In some embodiments, the system may include a substrate (e.g., 113C) and an electrochemical cell (e.g., 121A) of the battery pack. In some embodiments, cell 121A may be present alone, while in other embodiments, additional cells (e.g., optional cells 121B and 121C) and/or additional cell sets (e.g., optional cell set 122 in addition to cell set 121) may be present (e.g., to form battery 120). In some embodiments, the substrate may include a controller (e.g., 114), which may be integrated into the substrate or may be attached or connected. In some embodiments, the controller may control the cell(s) (e.g., as described elsewhere herein). In some embodiments, the controller may include one or more processors (e.g., as described elsewhere herein).

In some embodiments, the substrate may be directly connected to the cell(s) and configured to transfer heat, power, and signals between the substrate and the cell(s).

In some embodiments, the substrate may transfer heat in either direction directly between multiple cells and/or directly between one or more cells and the substrate. In some embodiments, the substrate and the cell(s) may share thermal responsibility, such that if one needs to have heat transferred to it, heat from the other(s) can transfer heat to it, and if one needs to have heat transferred from it, the other(s) can absorb heat from it. For example, charging cell(s) when very cold (e.g., at high altitude) is normally harmful to them, and the substrate could transfer heat to cold cell(s), while in other cases the substrate may operate as a heat sink for cell(s). In some embodiments, the substrate may be sufficient for heat management in about 30% of all usage cases by itself, and a battery system may operate without additional heat management if limited to such usage cases.

In some embodiments, transfer of heat may be accomplished at least in part by using thermally conductive materials (e.g., as described elsewhere herein).

In some embodiments, the substrate may provide heat transfer to and/or from the cell(s) via a physical connection between the substrate and the cell(s) (e.g., as described elsewhere herein).

In some embodiments, a power bus may be integrated into the substrate. In some embodiments, the power bus may be connected to the cell(s) and may transfer power to and/or from the cell(s). For example, the substrate may include electronic traces or other connections that may provide power transfer between the cell(s) and the load and/or charging source.

In some embodiments, the substrate may include electronic traces or other connections that provide signal transfer between the controller, the cell(s), and any other electronic components. For example, the substrate may include a CAN bus (e.g., 115) and at least one circuit breaker (e.g., 117). Additionally, the substrate may include at least one electrochemical cell terminal.

In some embodiments, the power bus may be physically connected to the cell(s) without wires (e.g., as described elsewhere herein). In some embodiments, the cell(s) may be connected to the substrate at least in part by laser welding.

In some embodiments, the cell(s) and the substrate may be disposed in a housing. In some embodiments, the housing may encircle a portion of the cell(s) and/or the substrate. In some embodiments, the housing may provide pressure to hold the cell(s) in a desired configuration.

In some embodiments, the controller may determine (e.g., using sensor 116) and/or communicate (e.g., using CAN bus 115) various information. Examples of this information include temperature information of the cell(s), voltage and/or current information of the cell(s), balancing information of the cell(s), charging information of the cell(s), diagnostic information of the cell(s), and health information of the cell(s) (e.g., as described elsewhere herein).

In some embodiments, the power bus may include at least one layer of conductive material embedded in the substrate (e.g., as described elsewhere herein).

In some embodiments, the cell(s) may include a lithium-metal electrode active material (e.g., as described elsewhere herein).

In some embodiments, the substrate may include at least one opening into which at least a portion of the cell(s) may be inserted (e.g., as described elsewhere herein).

Figure 1D:
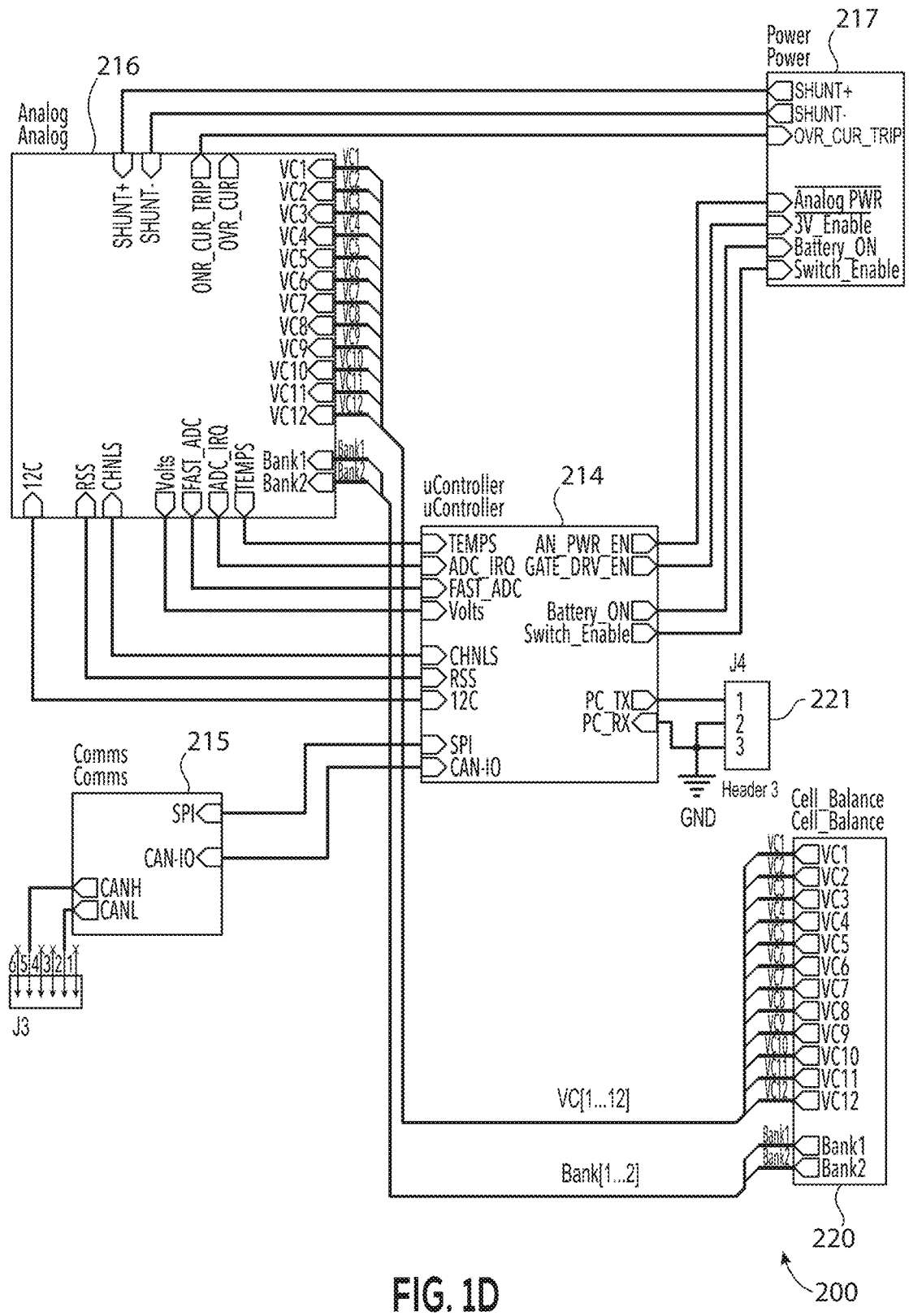
FIG. 1D is a wiring diagram illustrating a representative battery management system, according to some embodiments.

FIG. 1D depicts a representative wiring diagram of a battery management system 200. In some embodiments, system 200 may include at least one controller, such as microcontroller and associated circuitry 214, which may be similar to other controllers described elsewhere herein. In some embodiments, system 200 may include at least one communication bus, such as CAN Bus 215, which may be similar to CAN Bus 115 described elsewhere herein. In some embodiments, system 200 may include at least one conditioning and measurement component, such as circuitry 216, which may be similar to sensor 116 described elsewhere herein. In some embodiments, circuitry 216 may perform signal conditioning and measurement of characteristics such as voltages, temperatures, and currents.

In some embodiments, system 200 may include at least one communication bus, such as power circuitry 217, which may be similar to breaker 117 described elsewhere herein. In some embodiments, power circuitry 217 may provide circuit breaking, power supplying, shunts, and so on. In some embodiments, system 200 may include at least one balancing component, such as balancing circuitry 220. In some embodiments, balancing circuitry 220 may perform cell grouping and cell group balancing. In some embodiments, system 200 may include at least one interface, such as interface 221, which may include a serial interface, such as for transistor-transistor logic serial communication.

In some embodiments, any combination of the components in FIG. 1D, including all of them, may be included on a single substrate (e.g., a PCB). The inventors have recognized and appreciated that, in accordance with certain embodiments, including such components, like the balancing component, on a single substrate may reduce the risk of fire, especially as the components may be connected without wires (which can themselves catch fire) as described elsewhere herein.

Figure 2A:
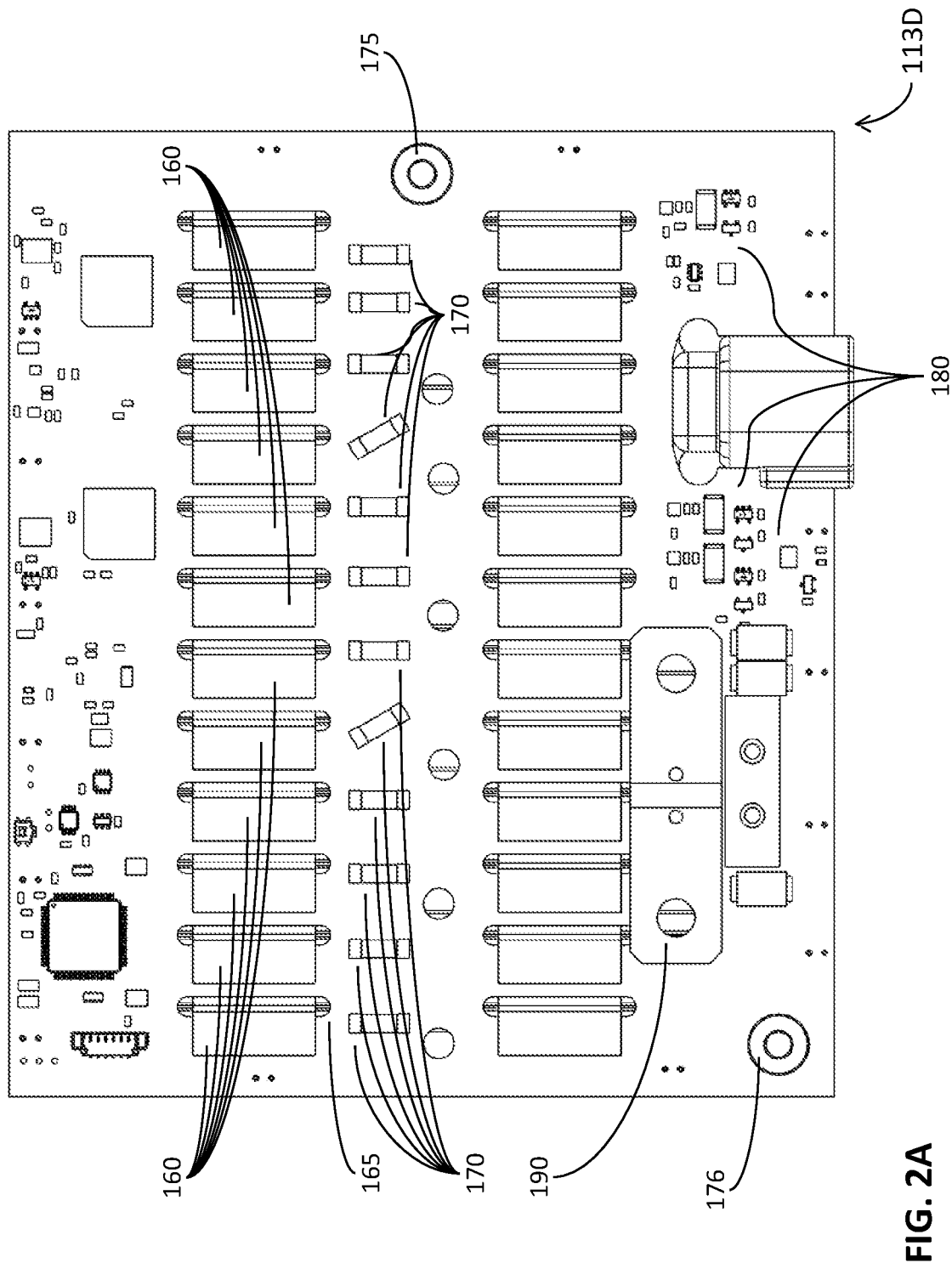
FIG. 2A is a top view of a representative substrate and battery, according to some embodiments.

FIG. 2A depicts a representative substrate (e.g., 113D) and battery (of which cell tabs are shown with 160 as one example) from a top view. In some embodiments, the substrate may include at least one cell group balance circuit, such as the three cell group balance circuits 180, which may be similar to balancing circuitry 220 described elsewhere herein. In some embodiments, the substrate may include at least one current measuring component, such as shunt 190, which may measure current going through connected components. In some embodiments, the substrate may include at least one fusing circuitry, such as the numerous fuses 170, which may be placed between the cell tabs 160 or in any other suitable position. In some embodiments, the fuses may each protect a cell, providing additional protection beyond the circuit breaker(s) described elsewhere herein.

In some embodiments, the substrate may include at least one PCB via, such as the numerous vias 165. In some embodiments, the substrate may include at least one battery post, such as positive battery post 175 and negative battery post 176.

Figure 2B:
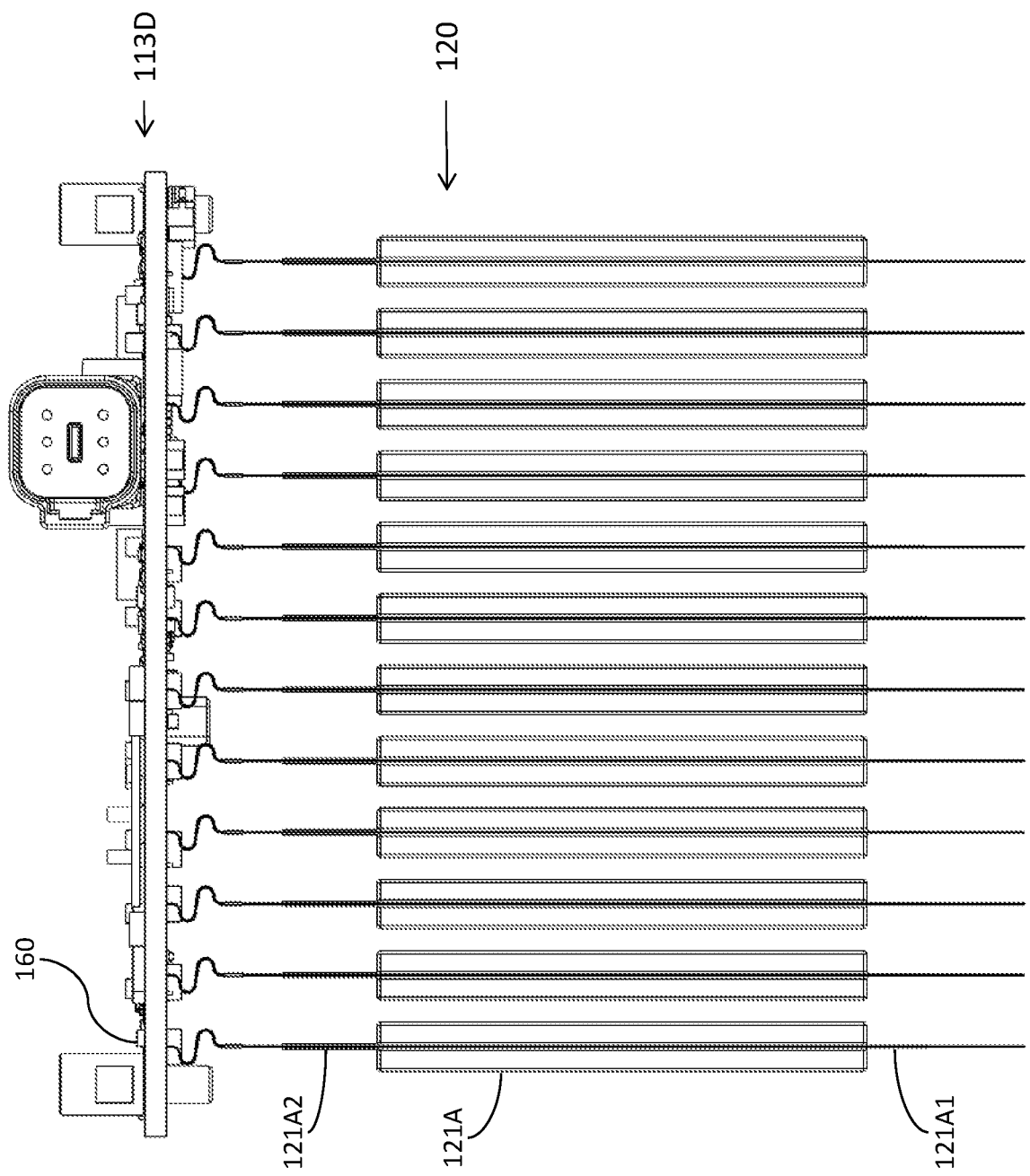
FIG. 2B is a side view of a representative substrate and battery, according to some embodiments.

FIG. 2B depicts the representative substrate and battery from a side view. In some embodiments, the battery (e.g., 120) may include at least one cell, such as cell 121A and the numerous other cells shown in FIG. 2B. In some embodiments, the cell(s) may include at least one tab, such as tab 160. In some embodiments, the cell(s) may include at least one active area, such as the full width active area pouch section 121A1. In some embodiments, the cell(s) may include at least one seal area, such as pouch seal area 121A2.

Figure 2C:
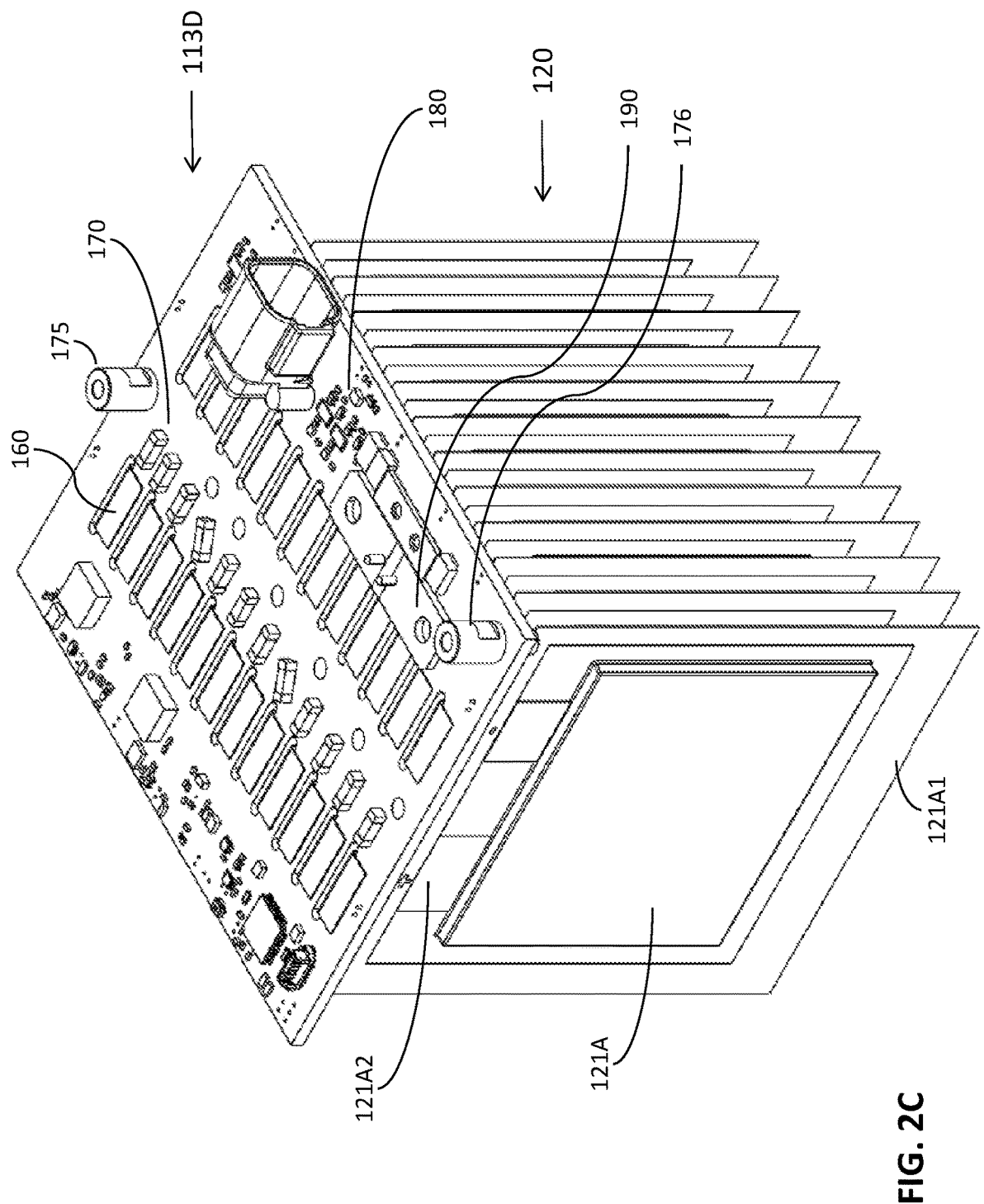
FIG. 2C is a perspective view of a representative substrate and battery, according to some embodiments.
Figure 2D:
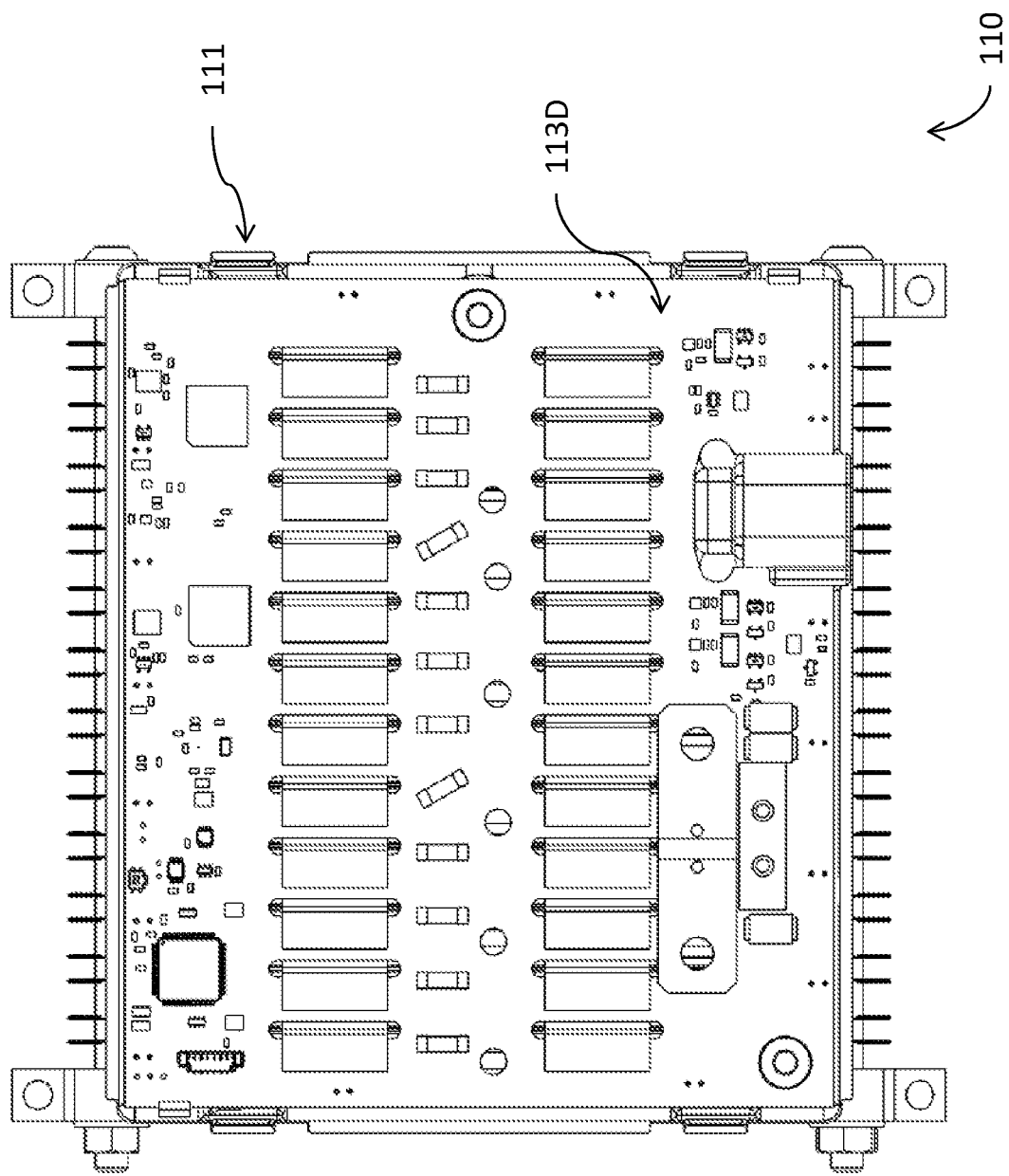
FIG. 2D is a top view of a representative battery pack, according to some embodiments.
Figure 2E:
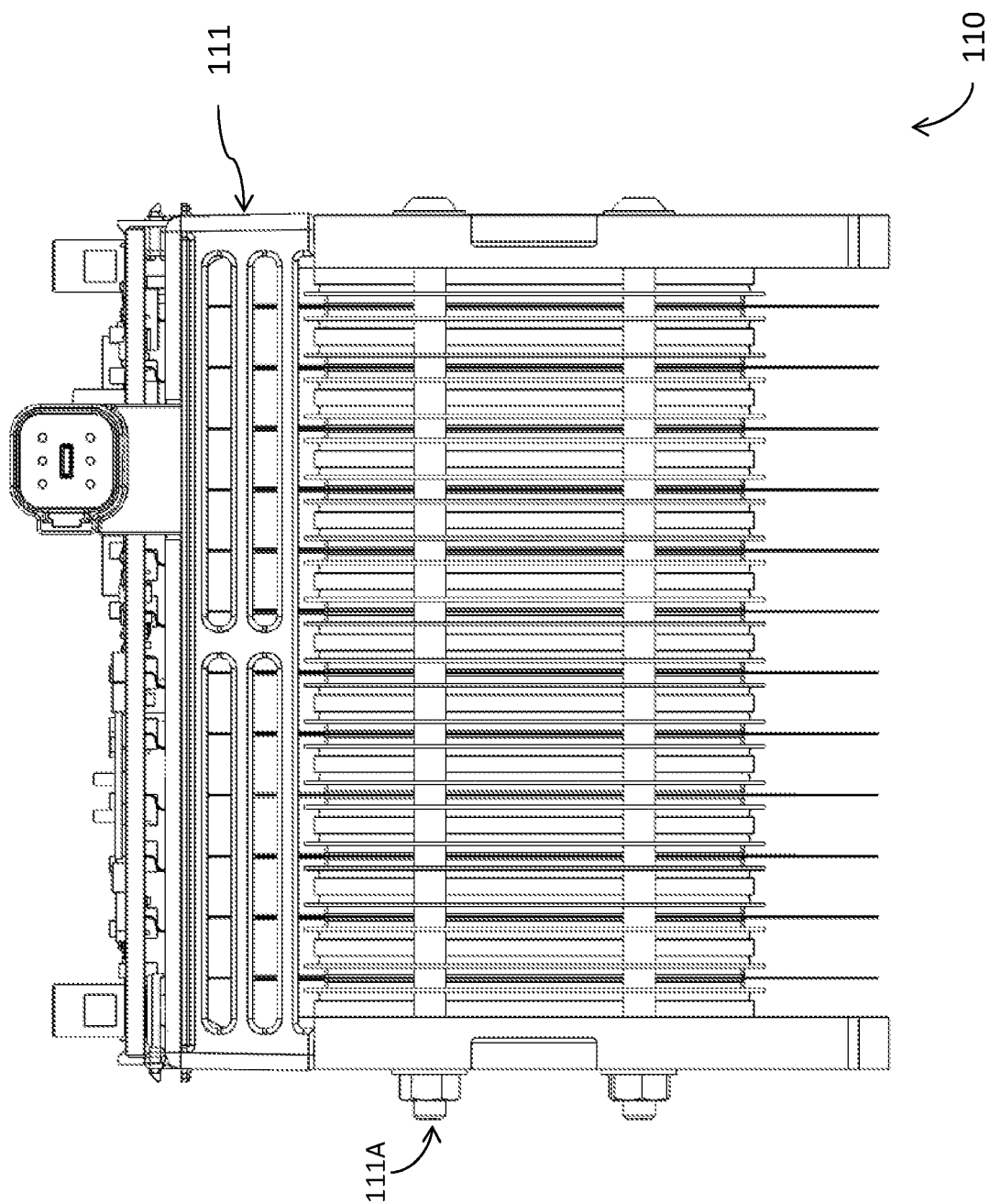
FIG. 2E is a side view of a representative battery pack, according to some embodiments.
Figure 2F:
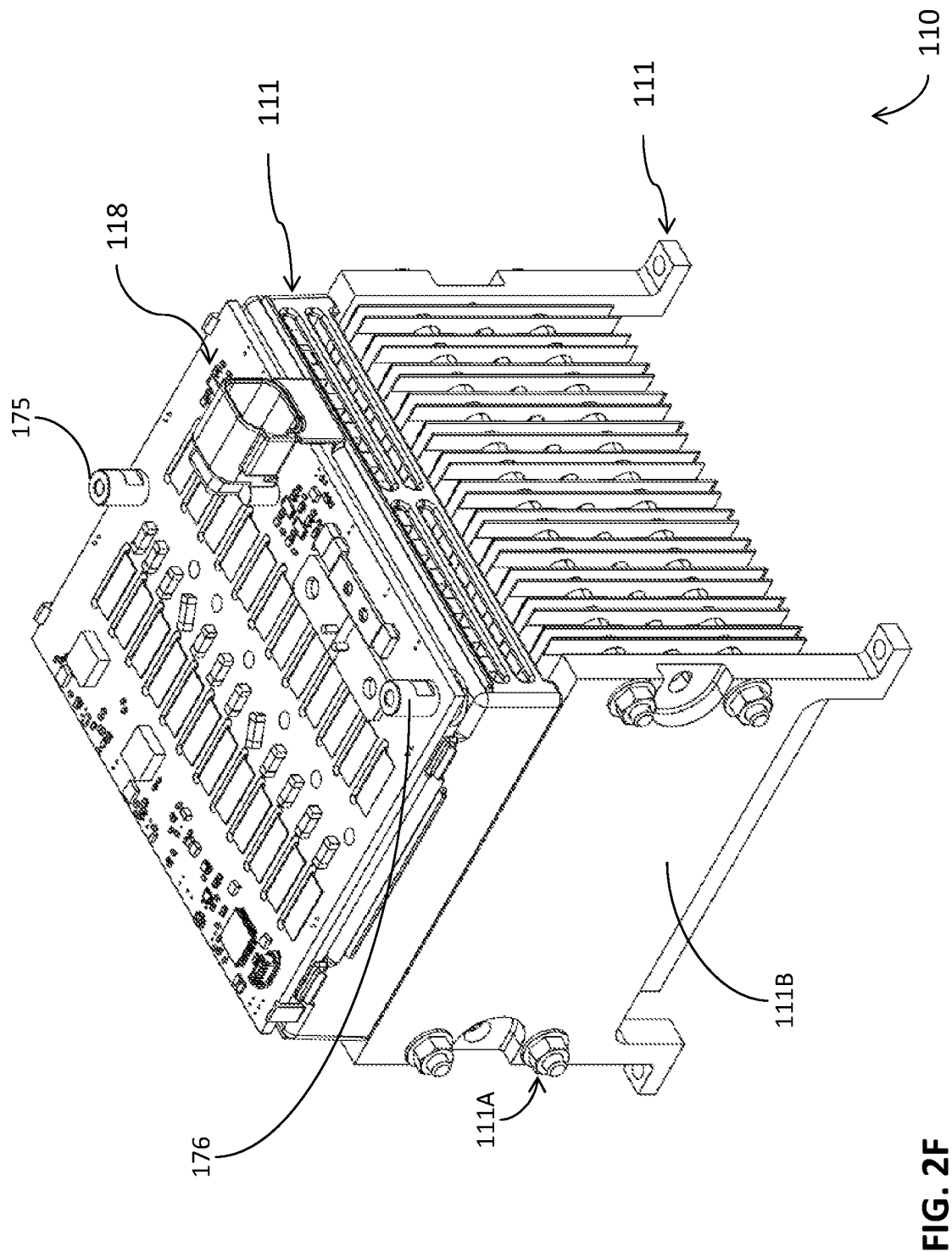
FIG. 2F is a perspective view of a representative battery pack, according to some embodiments.

FIG. 2C depicts the representative substrate and battery from a perspective view, including elements shown in FIGS. 2A-2B from another view.

FIG. 2D depicts a representative battery pack (e.g., 110) from a top view. In some embodiments, the battery pack may include a housing, such as housing 111 (e.g., as described elsewhere herein). In some embodiments, the battery pack may have a volume of 6000 cubic centimeters or less. In some embodiments, the battery pack may have a volume of 18000 cubic centimeters or less. In some embodiments, the battery pack may have a minimum average current among the cells of 5 amperes at 12 volts nominal.

FIG. 2E depicts the representative battery pack from a side view. FIG. 2F depicts the representative battery pack from a perspective view. In some embodiments, the battery pack may include at least one plate, such as the two end plates 111B. In some embodiments, the plate(s) may evenly apply pressure to the cell(s) from opposing sides. In some embodiments, the battery pack may include at least one fastener, such as the four tension rods 111A. In some embodiments, the fasteners may hold the plates together, providing pressure to the plates. In some embodiments, the battery pack may include at least one battery post, such as positive battery post 175 and negative battery post 176.

Figure 3A:
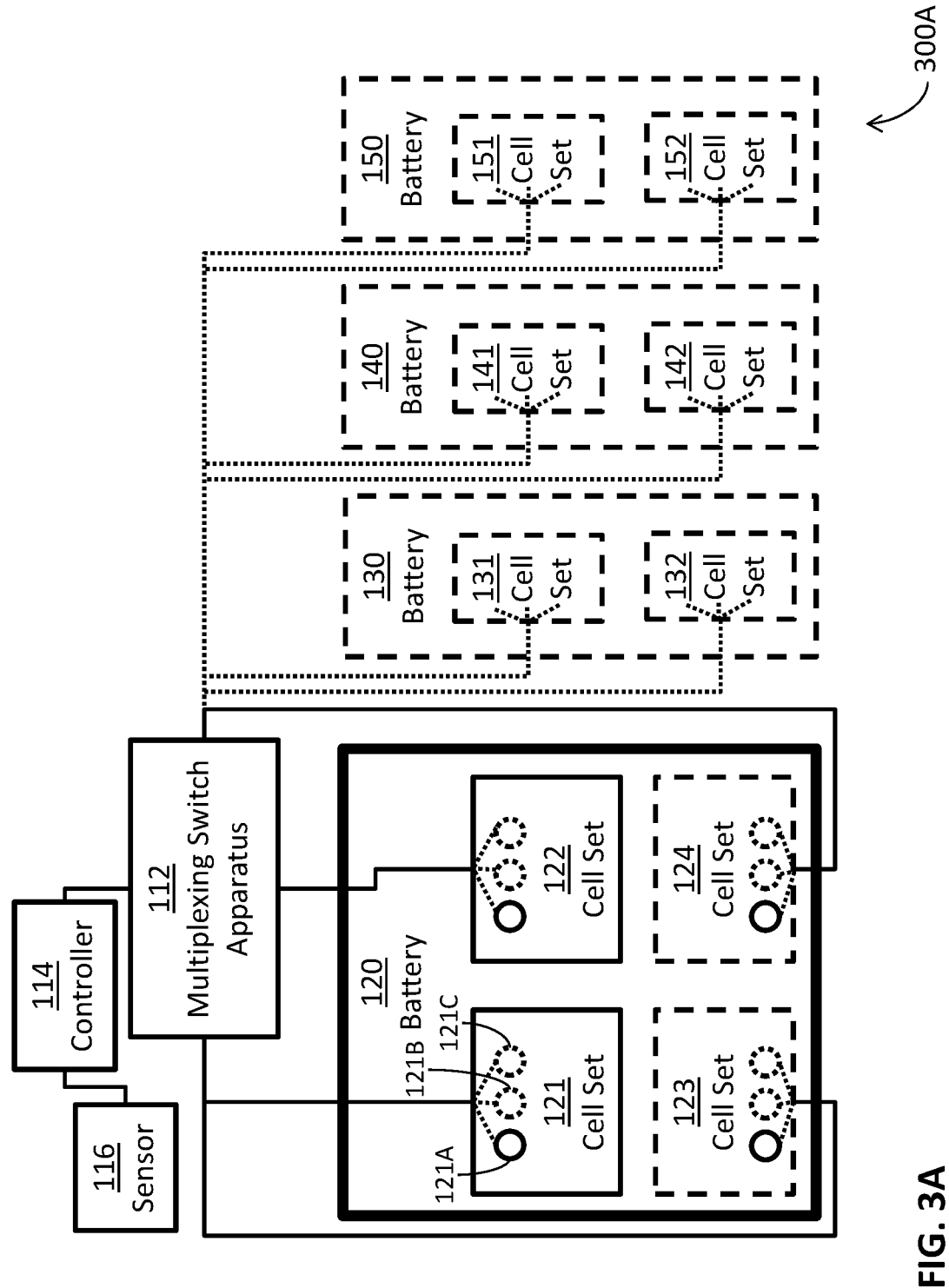
FIG. 3A is a block diagram illustrating a representative battery management system, according to some embodiments.

FIG. 3A depicts a representative battery management system 300A. In some embodiments, such as embodiments having multiple cells, representative system 300A may include a multiplexing switch apparatus (e.g., 112), a controller (e.g., 114), one or more sensors (e.g., 116), and one or more batteries (e.g., 120, 130, 140, 150, and so on). It should be appreciated that although only a single multiplexing switch apparatus 112, controller 114, sensor 116, and only four batteries 120-150 are shown in FIG. 3A, any suitable number of these components may be used. Any of numerous different modes of implementation may be employed. Furthermore, although a label in the singular is used herein to reference a multiplexing switch apparatus, it should be appreciated that the components used for the multiplexing and switching described herein may be distributed across any suitable number of devices (e.g., switches).

According to some embodiments, the battery or batteries may include at least one lithium-metal battery. Additionally, the battery or batteries (e.g., 120-150) may respectively include one or more cell sets (e.g., 121-124, 131-132, 141-142, 151-152, and so on), referred to also as sets of cells. In some embodiments, two or more sets of cells are included in each battery, such as 121-122 and so on. Additionally, each set of cells (e.g., cell set 121) may include one or more cells (e.g., 121A-121C). In some embodiments, each set of cells may have a single cell. Alternatively, each set of cells may include multiple cells and may form a cell "block," or multiple sets of cells may together form a cell block. Additionally, each cell (either in a battery, all the batteries in a battery pack, or in a set of cells) or set of cells may utilize the same electrochemistry. That is to say, in some embodiments, each cell may make use of the same anode active material and the same cathode active material.

In some embodiments, the controller may use the multiplexing switch apparatus to selectively discharge and charge the cells or sets of cells at different, programmable rates. For example, the controller may use the multiplexing switch apparatus to selectively discharge the cells or sets of cells at a first rate at least 2 times higher than a second rate of charging the sets of cells (i.e., discharging twice as fast as charging). Alternatively or additionally, the first rate of discharging may be at least 4 times higher than the second rate of charging the sets of cells (i.e., discharging four times as fast as charging). The inventors have recognized and appreciated that, in accordance with certain embodiments, such ratios of discharge rate to charge rate may improve the performance and cycle life of the cells.

In some embodiments, the load may be at least one component of a vehicle. The vehicle may be any suitable vehicle, adapted for travel on land, sea, and/or air. For example, the vehicle may be an automobile, truck, motorcycle, boat, helicopter, airplane, and/or any other suitable type of vehicle.

Figure 3B:
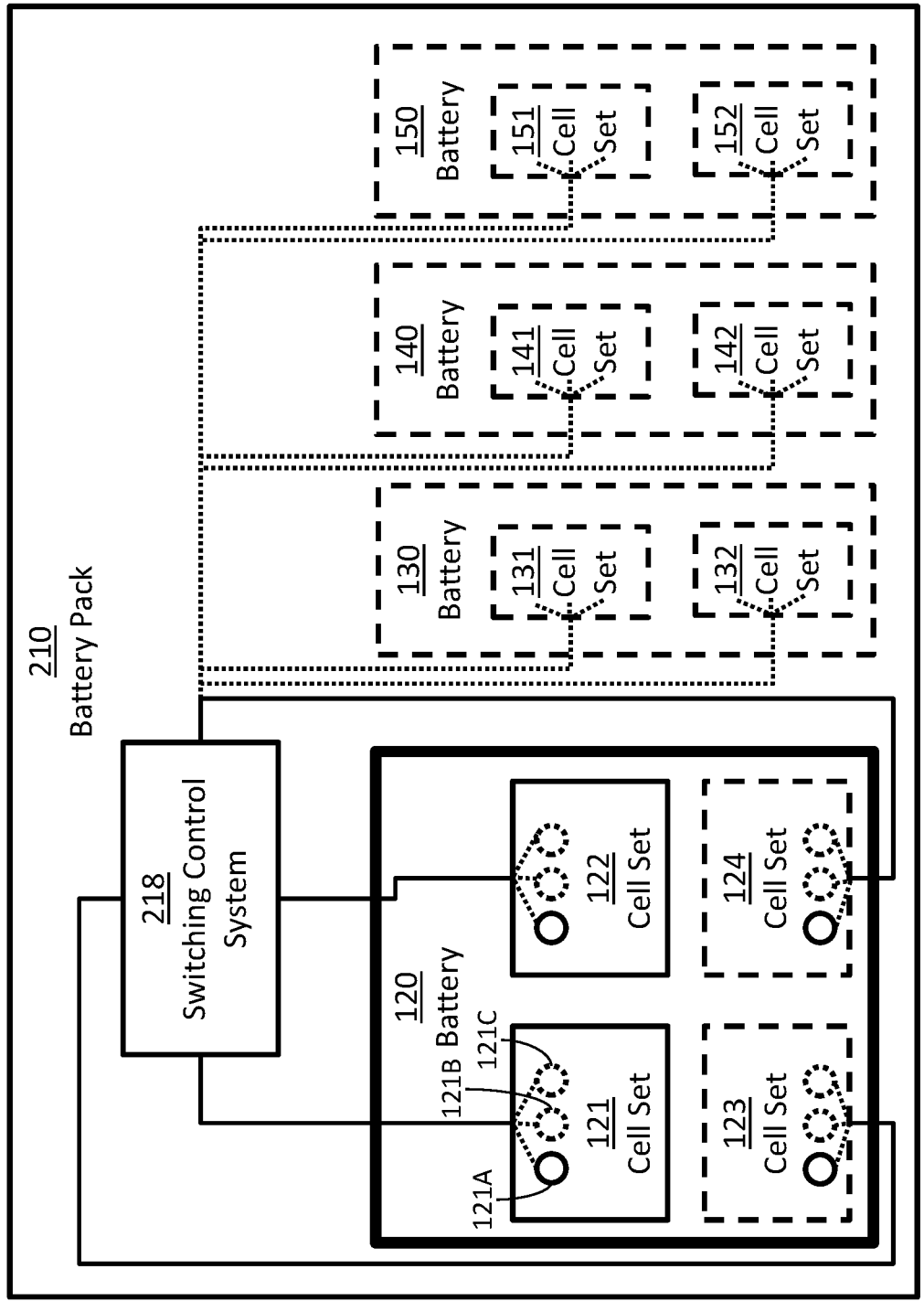
FIG. 3B is a block diagram illustrating a representative battery pack, according to some embodiments.

FIG. 3B depicts a representative battery pack 210. In some embodiments, representative battery pack 210 may include a switching control system (e.g., 218) and one or more batteries (e.g., 120, 130, 140, 150, and so on). It should be appreciated that although only a single switching control system 218 and only four batteries 120-150 are shown in FIG. 3B, any suitable number of these components may be used. Any of numerous different modes of implementation may be employed. Furthermore, although a label in the singular is used herein to reference a switching control system, it should be appreciated that the components used for the control and switching described herein may be distributed across any suitable number of devices (e.g., switches, controller(s), etc.).

In some embodiments, a switching control system (e.g., 218) may include an array of switches, and it may include a controller. Additionally, the switching control system may be connected to each set of cells and/or to each cell of the batteries individually. In some embodiments, the switching control system may be integrated into the battery pack. Additionally, the switching control system may control the switch(es) (such as in a switch array) to discharge the cells or sets of cells sequentially, such as in a predefined order associated with the cells or sets of cells. Alternatively or additionally, the switching control system may control the switch(es) to discharge the cells or sets of cells based on any one or more of the following: a duration of a connection between a load and a set of cells currently connected to the load (which may be at least 0.01 seconds in some embodiments), a delivered discharge capacity at the connection, and the value of a function. In certain embodiments, the basis for the control may not include a number of prior discharge cycles of the set of cells.

According to some embodiments, the switching control system may perform any number of other functions, such as those of the controllers described in relation to FIGS. 1A-3B above.

It should be appreciated that any of the components of representative system 300A or representative battery pack 210 may be implemented using any suitable combination of hardware and/or software components. As such, various components may be considered a controller that may employ any suitable collection of hardware and/or software components to perform the described function.

The anodes of the electrochemical cells described herein may comprise a variety of anode active materials. As used herein, the term "anode active material" refers to any electrochemically active species associated with the anode. For example, the anode may comprise a lithium-containing material, wherein lithium is the anode active material. Suitable electroactive materials for use as anode active materials in the anode of the electrochemical cells described herein include, but are not limited to, lithium metal such as lithium foil and lithium deposited onto a conductive substrate, and lithium alloys (e.g., lithium-aluminum alloys and lithium-tin alloys). Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode.

In one embodiment, an electroactive lithium-containing material of an anode active layer comprises greater than 50% by weight of lithium. In another embodiment, the electroactive lithium-containing material of an anode active layer comprises greater than 75% by weight of lithium. In yet another embodiment, the electroactive lithium-containing material of an anode active layer comprises greater than 90% by weight of lithium. Additional materials and arrangements suitable for use in the anode are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

The cathodes in the electrochemical cells described herein may comprise a variety of cathode active materials. As used herein, the term "cathode active material" refers to any electrochemically active species associated with the cathode. Suitable electroactive materials for use as cathode active materials in the cathode of the electrochemical cells of some embodiments include, but are not limited to, one or more metal oxides, one or more intercalation materials, electroactive transition metal chalcogenides, electroactive conductive polymers, sulfur, carbon and/or combinations thereof.

In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, titanium sulfide, and iron sulfide. In some embodiments, the cathode is an intercalation cathode comprising a lithium transition metal oxide or a lithium transition metal phosphate. Additional examples include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, $LiCo_xNi_{(1-x)}O_2$, and $LiCo_xNi_yMn_{(1-x-y)}O_2$ (e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X may be greater than or equal to 0 and less than or equal to 2. X is typically greater than or equal to 1 and less than or equal to 2 when the electrochemical cell is fully discharged, and less than 1 when the electrochemical cell is fully charged. In some embodiments, a fully charged electrochemical cell may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where ($0<x\leq1$), $LiMn_xNi_yO_4$ where (x+y=2) (e.g., $LiMn_{1.5}Ni_{0.5}O_4$), $LiNi_xCo_yAl_zO_2$ where (x+y+z=1), $LiFePO_4$, and combinations thereof. In some embodiments, the electroactive material within the cathode comprises lithium transition metal phosphates (e.g., $LiFePO_4$), which can, in certain embodiments, be substituted with borates and/or silicates.

As noted above, in some embodiments, the cathode active material comprises one or more chalcogenides. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of some embodiments may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments, an electroactive sulfur-containing material of a cathode active layer comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathode active layers of some embodiments may comprise from about 20 to 100% by weight of electroactive cathode materials (e.g., as measured after an appropriate amount of solvent has been removed from the cathode active layer and/or after the layer has been appropriately cured). In one embodiment, the amount of electroactive sulfur-containing material in the cathode active layer is in the range of 5-30% by weight of the cathode active layer. In another embodiment, the amount of electroactive sulfur-containing material in the cathode active layer is in the range of 20% to 90% by weight of the cathode active layer.

Additional materials suitable for use in the cathode, and suitable methods for making the cathodes, are described, for example, in U.S. Pat. No. 5,919,587, filed May 21, 1997, entitled "Novel Composite Cathodes, Electrochemical Cells Comprising Novel Composite Cathodes, and Processes for Fabricating Same," and U.S. Patent Publication No. 2010/0035128 to Scordilis-Kelley et al. filed on Aug. 4, 2009, entitled "Application of Force in Electrochemical Cells," each of which is incorporated herein by reference in its entirety for all purposes.

A variety of electrolytes can be used in association with the electrochemical cells described herein. In some embodiments, the electrolyte may comprise a non-solid electrolyte, which may or may not be incorporated with a porous separator. As used herein, the term "non-solid" is used to refer to materials that are unable to withstand a static shear stress, and when a shear stress is applied, the non-solid experiences a continuing and permanent distortion. Examples of non-solids include, for example, liquids, deformable gels, and the like.

The electrolytes used in electrochemical cells described herein can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. Exemplary materials suitable for use in the electrolyte are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

U.S. application Ser. No. 16/527,903, filed Jul. 31, 2019, and entitled "Multiplexed Charge Discharge Battery Management System" is incorporated herein by reference in its entirety for all purposes.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U. S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821, 576, filed Jun. 22, 2007, published as U.S. Pub. No. 2008/ 0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/ Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/ 000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727, 862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. Provisional Patent Apl. Ser. No. 61/376,554, filed on Aug. 24, 2010, entitled "Electrically Non-Conductive Materials for Electrochemical Cells;" U.S. Provisional patent application Ser. No. 12/862,528, filed on Aug. 24, 2010, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur"; U.S. patent application Ser. No. 12/862,551, filed on Aug. 24, 2010, published as U.S. Pub. No. 2011/0070491, entitled "Electrochemical Cells Comprising Porous Structures Comprising Sulfur"; U.S. patent application Ser. No. 12/862,576, filed on Aug. 24, 2010, published as U.S. Pub. No. 2011/ 0059361, entitled "Electrochemical Cells Comprising Porous Structures Comprising Sulfur"; U.S. patent application Ser. No. 12/862,581, filed on Aug. 24, 2010, published as U.S. Pub. No. 2011/0076560, entitled "Electrochemical Cells Comprising Porous Structures Comprising Sulfur"; U.S. Patent Apl. Ser. No. 61/385,343, filed on Sep. 22, 2010, entitled "Low Electrolyte Electrochemical Cells"; and U.S. patent application Ser. No. 13/033,419, filed Feb. 23, 2011, entitled "Porous Structures for Energy Storage Devices". All other patents and patent applications disclosed herein are also incorporated by reference in their entirety for all purposes.

Figure 4:
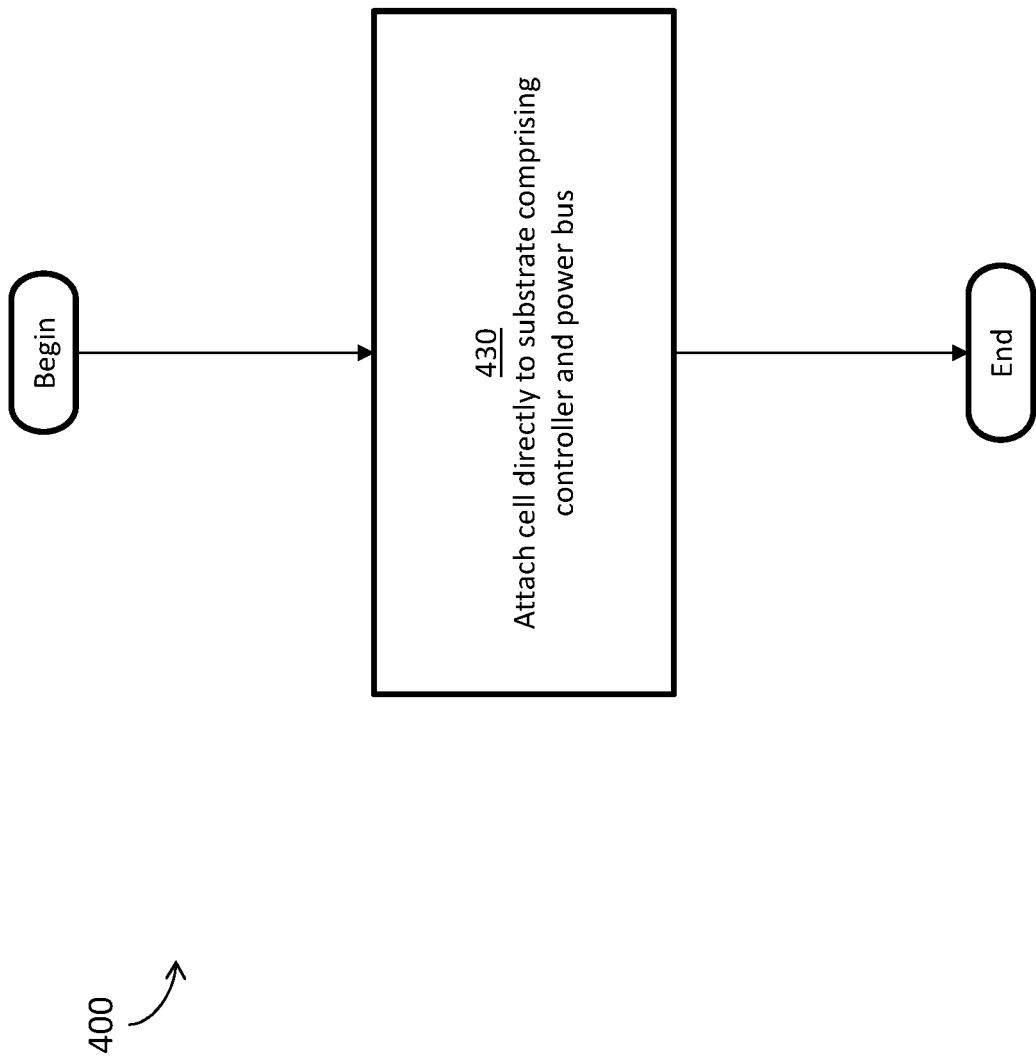
FIG. 4 is a flow chart depicting a representative process for assembling a battery pack, according to some embodiments.

FIG. 4 depicts a representative high-level process 400 for assembling a battery pack. The acts of representative process 400 are described in detail in the paragraphs that follow.

In some embodiments, representative process 400 may include act 430, wherein at least one electrochemical cell of the battery pack (such as electrochemical cell 121A described above) may be attached directly to a substrate (such as any of 113A-D described above) at least in part by welding. In some embodiments, the substrate may include at least one controller (such as controller 114 described above) and at least one battery power bus (such as power bus 118 described above).

In some embodiments, process 400 may then end or repeat as necessary, such as for more cells.

Figure 5:
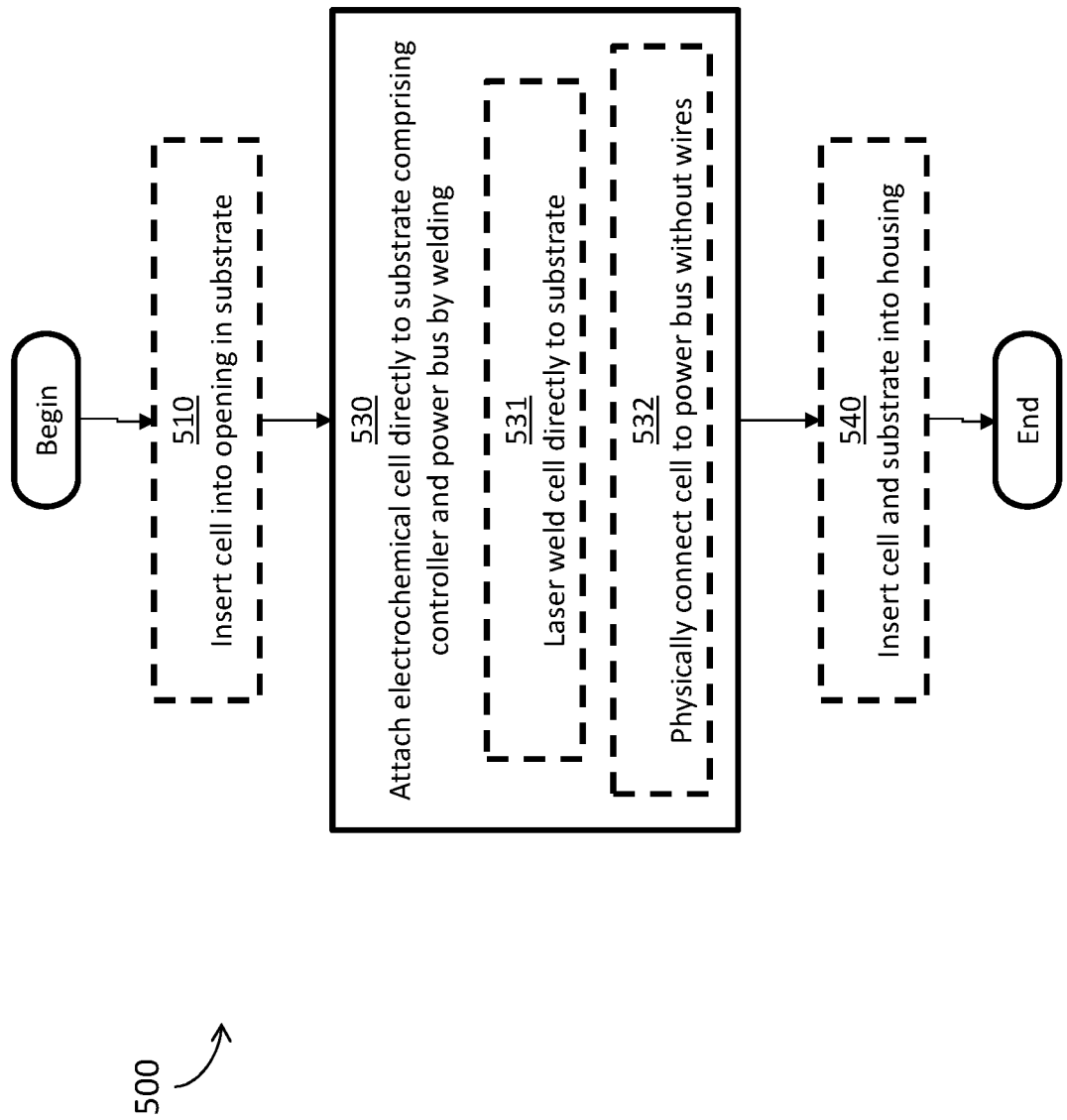
FIG. 5 is a flow chart depicting an additional representative process for assembling a battery pack, according to some embodiments.

FIG. 5 depicts a representative process 500 for assembling a battery pack. The acts of representative process 500 are described in detail in the paragraphs that follow.

In some embodiments, representative process 500 optionally may begin at act 510, wherein at least a portion of at least one electrochemical cell (e.g., 121A) of the battery pack may be inserted into at least one opening in a substrate (e.g., any of 113A-D). In some embodiments, the substrate may include at least one controller (such as controller 114 described above) and at least one battery power bus (such as power bus 118 described above).

In some embodiments, one or more batteries (e.g., 120-150) of the battery pack (e.g., 210) may include sets (e.g., 121, 122, 123, and/or 124) of the cells (e.g., 121A-C), and each set of cells may comprise one or more cells that may be inserted at least in part at various times or the same time. For example, all the cells in a battery pack may be inserted at least in part into the substrate at the same time.

In some embodiments, representative process 500 may then proceed to act 530, wherein the cell(s) of the battery pack may be attached directly to the substrate at least in part by welding.

In some embodiments, act 530 may optionally include act 531, wherein the cell(s) may be laser welded to the substrate. In some embodiments, act 530 may optionally include act 532, wherein the cell(s) may be physically connected to the battery power bus without wires, which may provide the attachment described above or may be an additional attachment.

In some embodiments, process 500 may then proceed to act 540, wherein the cell(s) and/or the substrate may be inserted into a housing (e.g., housing 111).

In some embodiments, process 500 may then end or repeat as necessary.

Figure 6:
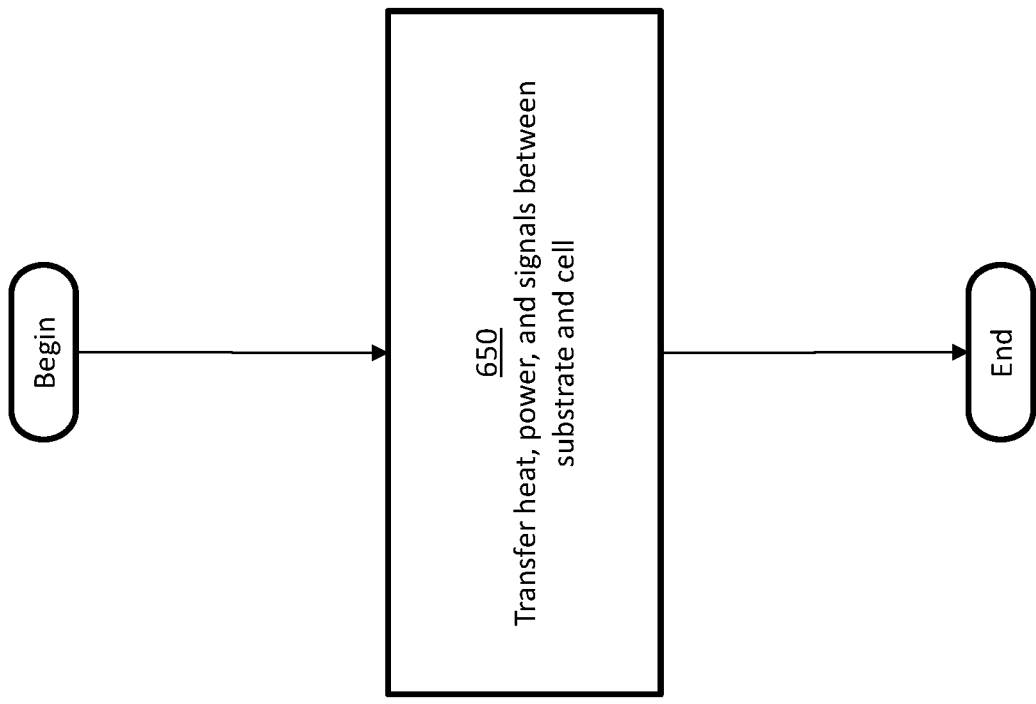
FIG. 6 is a flow chart depicting a representative process for thermal management for a battery pack, according to some embodiments.

FIG. 6 depicts a representative high-level process 600 for thermal management for a battery pack. The acts of representative process 600 are described in detail in the paragraphs that follow.

In some embodiments, representative process 600 may include act 650, wherein heat, power, and signals may be transferred between a substrate (e.g., any of 113A-D) directly connected to at least one electrochemical cell (e.g., any of 121A-C) of the battery pack and the cell(s).

In some embodiments, process 600 may then end or repeat as necessary.

Figure 7:
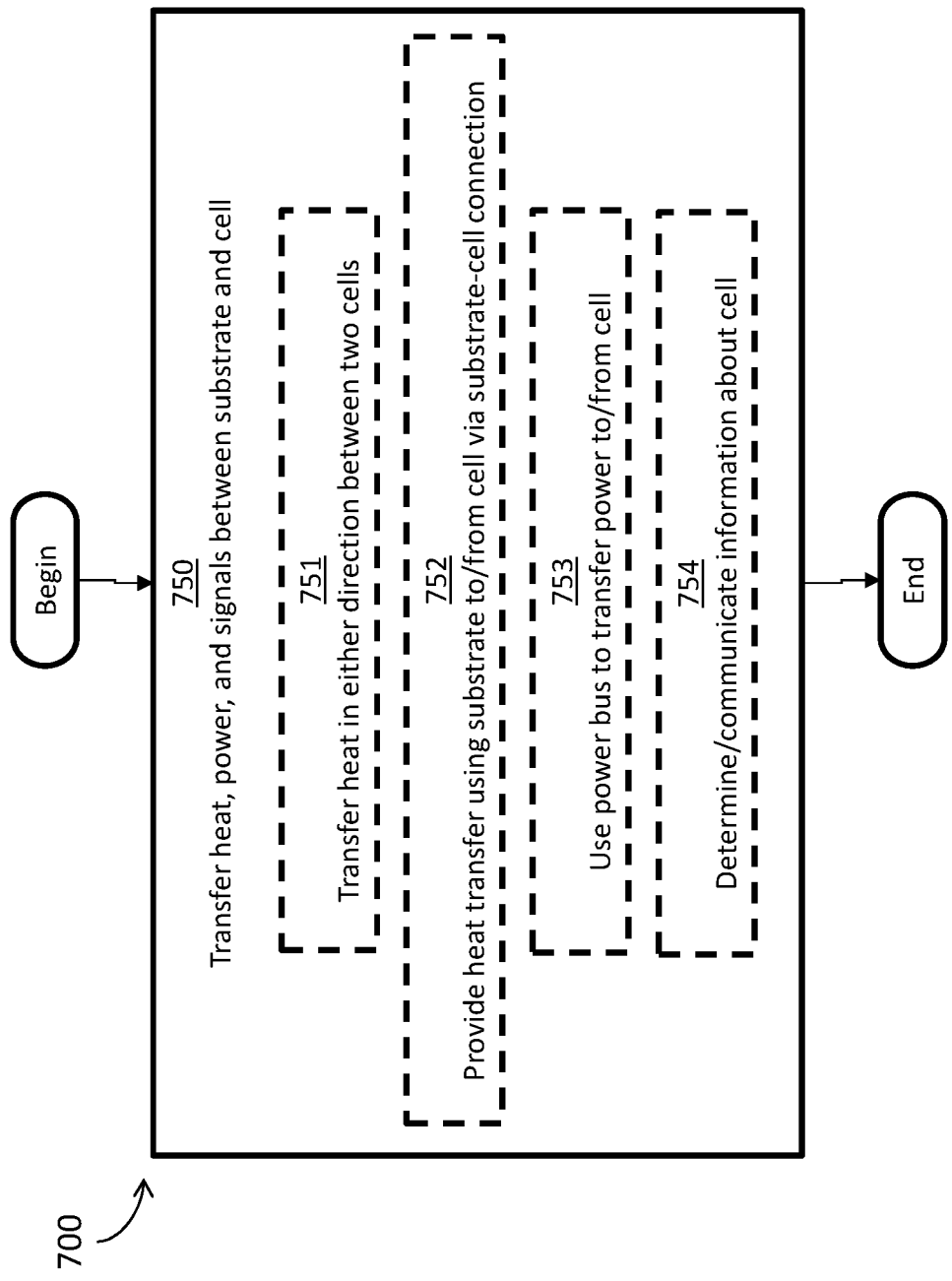
FIG. 7 is a flow chart depicting an additional representative process for thermal management for a battery pack, according to some embodiments.

FIG. 7 depicts a representative high-level process 700 for thermal management for a battery pack. The acts of representative process 700 are described in detail in the paragraphs that follow.

In some embodiments, representative process 700 may include act 750, wherein heat, power, and signals may be transferred between a substrate (e.g., any of 113A-D) directly connected to at least one electrochemical cell (e.g., any of 121A-C) of the battery pack and the cell(s).

In some embodiments, act 750 may optionally include act 751, wherein heat may be transferred in either direction directly between multiple cells and/or directly between one cell and the substrate.

In some embodiments, act 750 may optionally include act 752, wherein heat transfer may be provided to the battery pack using the substrate to and/or from the cell(s) via a physical connection between the substrate and the cell(s).

In some embodiments, act 750 may optionally include act 753, wherein a power bus (such as power bus 118 described above) may be used to transfer power to and/or from the cell(s). For example, the power bus may be integrated into the substrate, and the power bus may be connected to the cell(s).

In some embodiments, act 750 may optionally include act 754, wherein at least one of the following may be determined and/or communicated, such as by a controller (such as controller 114 described above): temperature information of the at least one electrochemical cell; voltage and/or current information of the at least one electrochemical cell; balancing information of the at least one electrochemical cell; charging information of the at least one electrochemical cell; diagnostic information of the at least one electrochemical cell; and health information of the at least one electrochemical cell. For example, a sensor (such as 116 in FIGS. 1A-1C and 3A) may measure and/or the controller may determine and/or communicate any of this information.

In some embodiments, process 700 may then end or repeat as necessary.

It should be appreciated that, in some embodiments, the methods described above with reference to FIGS. 4-7 may vary, in any of numerous ways. For example, in some embodiments, the steps of the methods described above may be performed in a different sequence than that which is described, a method may involve additional steps not described above, and/or a method may not involve all of the steps described above.

Figure 8:
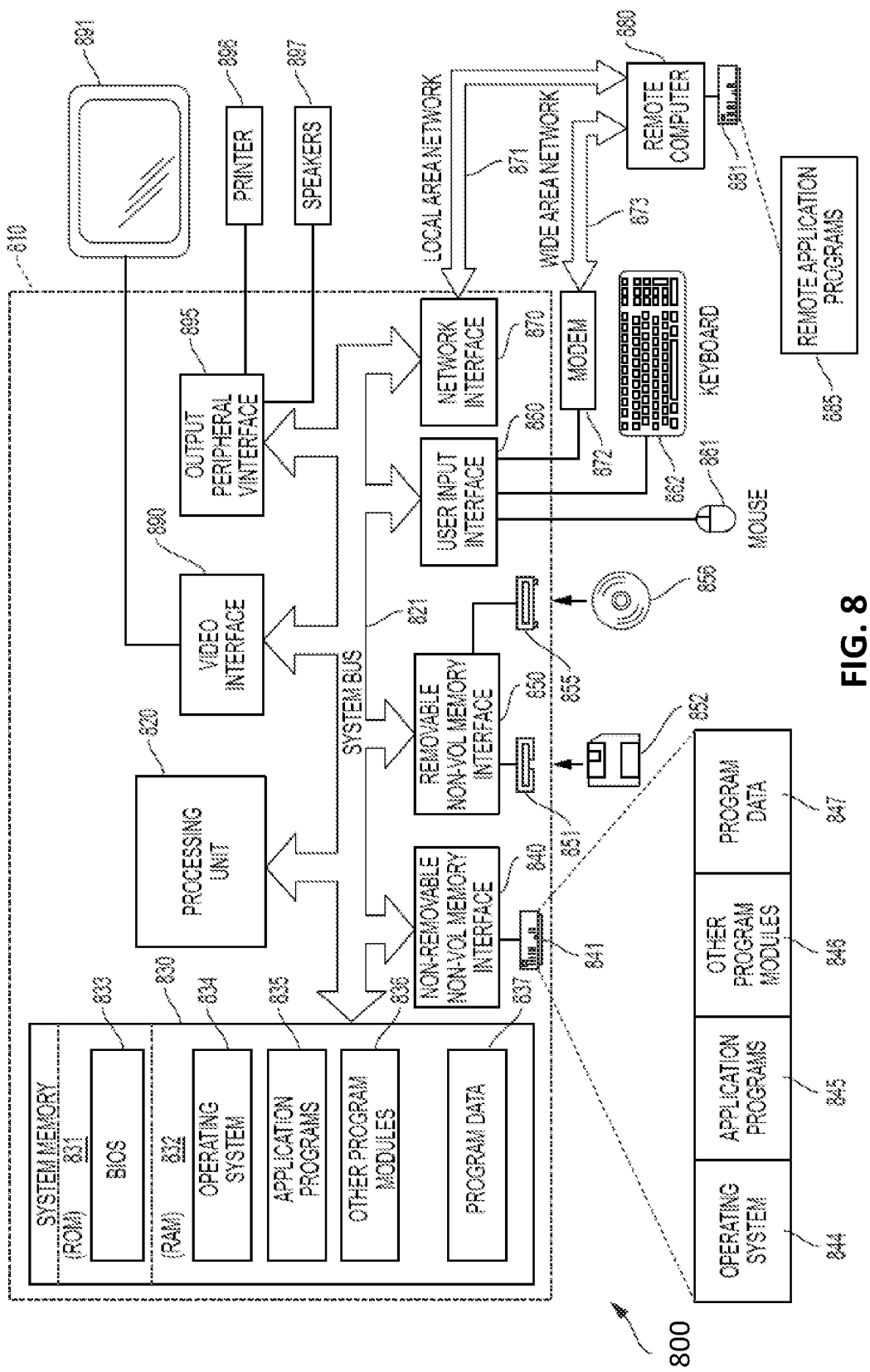
FIG. 8 is a block diagram depicting a representative computing system that may be used to implement certain aspects.

It should further be appreciated from the foregoing description that some aspects may be implemented using a computing device. FIG. 8 depicts a general purpose computing device in system 800, in the form of a computer 810, which may be used to implement certain aspects, such as any of the controllers described above (e.g., 114).

In computer 810, components include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media that may be used to store the desired information and may be accessed by computer 810. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 839 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 859 such as a CD-ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 849, and program data 847. Note that these components can either be the same as or different from operating system 834, application programs 835, other program modules 539, and program data 837. Operating system 844, application programs 845, other program modules 849, and program data 847 are given different numbers here to illustrate that, at a minimum, they are different copies. A user may enter commands and information into the computer 810 through input devices such as a keyboard 892 and pointing device 891, commonly referred to as a mouse, trackball or touch pad. Other input devices (not shown) may include a microphone, joystick, game pad, satellite dish, scanner, or the like. These and other input devices are often connected to the processing unit 820 through a user input interface 590 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 899, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 890, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, some embodiments may be embodied as a computer readable medium other than a computer-readable storage medium. Examples of computer readable media that are not computer readable storage media include transitory media, like propagating signals.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention may include each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery pack comprising:
   a substrate comprising:
     a battery power bus integrated into the substrate; and
     a pack controller integrated into and/or onto the substrate; and
   a plurality of electrochemical cells each connected directly to the substrate by a respective tab,
   wherein:
     the battery power bus is configured to transfer power to and/or from each of the plurality of electrochemical cells via the respective tab;
     the pack controller is configured to control transfer of power between the plurality of electrochemical cells and a load at least in part by connecting and/or disconnecting the plurality of electrochemical cells to and/or from the load; and
     a physical connection between the substrate and a first electrochemical cell of the plurality of electrochemical cells is configured to provide a heat flux of at least 1500 watts per square meter when the first electrochemical cell has a temperature of 100 degrees Celsius and the substrate has a temperature of 25 degrees Celsius.

2. The battery pack of claim 1, wherein each of the plurality of electrochemical cells is connected to the substrate at least in part by laser welding to the respective tab.

3. The battery pack of claim 1, further comprising:
   a housing in which the plurality of electrochemical cells and the substrate are disposed.

4. The battery pack of claim 1, wherein the respective tab is configured to provide heat transfer to and/or from the electrochemical cell.

5. The battery pack of claim 4, wherein the respective tab is configured to provide heat transfer directly between the electrochemical cell and another of the plurality of electrochemical cells, and/or directly between the electrochemical cell and the substrate in either direction.

6. The battery pack of claim 1, wherein the pack controller is configured to determine and/or communicate at least one of:
   temperature information of the battery pack;
   voltage and/or current information of the plurality of electrochemical cells in the battery pack;
   balancing information of the battery pack;
   charging information of the battery pack;
   diagnostic information of the battery pack; and
   health information of the battery pack.

7. The battery pack of claim 1, wherein the substrate comprises a printed circuit board.

8. The battery pack of claim 1, wherein the substrate comprises a controller area network bus and at least one circuit breaker.

9. The battery pack of claim 1, wherein the substrate comprises at least one electrochemical cell terminal.

10. The battery pack of claim 1, wherein the battery power bus comprises at least one layer of conductive material embedded in the substrate.

11. The battery pack of claim 1, wherein the pack controller comprises at least one processor.

12. The battery pack of claim 1, wherein each of the plurality of electrochemical cells comprises a lithium-metal electrode active material.

13. The battery pack of claim 1, wherein the substrate comprises, for each respective tab, an opening into which at least a portion of the respective tab is inserted.

14. The battery pack of claim 1, wherein the pack controller is configured to balance charge and/or discharge between a first electrochemical cell of the plurality of electrochemical cells and a second electrochemical cell of the plurality of electrochemical cells.

15. The battery pack of claim 1, wherein the pack controller comprises a processor integrated into and/or onto the substrate.

16. A printed circuit board comprising:
   a power bus integrated into the printed circuit board, wherein the power bus is connected to each of a plurality of electrochemical cells by respective tabs and configured to transfer power to and/or from the plurality of electrochemical cells via the respective tabs; and
   at least one controller integrated into and/or onto the printed circuit board and configured to control transfer of power between the plurality of electrochemical cells and a load at least in part by connecting and/or disconnecting the plurality of electrochemical cells to and/or from the load,
   wherein a physical connection between the printed circuit board and a first electrochemical cell of the plurality of electrochemical cells is configured to provide a heat flux of at least 1500 watts per square meter when the first electrochemical cell has a temperature of 100 degrees Celsius and the printed circuit board has a temperature of 25 degrees Celsius.

17. A thermal management system for a battery pack, the thermal management system comprising:
   a plurality of electrochemical cells of the battery pack; and
   a substrate directly connected to the plurality of electrochemical cells and configured to transfer heat, power, and signals between the substrate and the plurality of electrochemical cells, the substrate comprising a controller integrated into and/or onto the substrate and configured to selectively charge and/or discharge ones of the plurality of electrochemical cells,
   wherein a physical connection between the substrate and a first electrochemical cell of the plurality of electrochemical cells is configured to provide a heat flux of at least 1500 watts per square meter when the first electrochemical cell has a temperature of 100 degrees Celsius and the substrate has a temperature of 25 degrees Celsius.

18. The thermal management system of claim 17, wherein the controller is configured to balance the plurality of electrochemical cells.

19. The thermal management system of claim 17, wherein the controller comprises a processor integrated into and/or onto the substrate.

20. A method of thermal management for a battery pack, the method comprising:
   transferring heat, power, and signals between a substrate directly connected to a plurality of electrochemical cells of the battery pack and the plurality of electrochemical cells; and
   using a controller integrated into and/or onto the substrate, selectively charging and/or discharging ones of the plurality of electrochemical cells,
   wherein a physical connection between the substrate and a first electrochemical cell of the plurality of electrochemical cells provides a heat flux of at least 1500 watts per square meter when the first electrochemical cell has a temperature of 100 degrees Celsius and the substrate has a temperature of 25 degrees Celsius.

21. A method of assembling a battery pack, the method comprising:
   attaching a plurality of electrochemical cells of the battery pack directly to a substrate at least in part by welding a respective tab, for each of the plurality of electrochemical cells, to the substrate,
   wherein the substrate comprises at least one controller integrated into and/or onto the substrate and the substrate further comprises at least one battery power bus, the at least one controller configured to control transfer of power between the plurality of electrochemical cells and a load at least in part by connecting and/or disconnecting the plurality of electrochemical cells to and/or from the load, and
   wherein a physical connection between the substrate and a first electrochemical cell of the plurality of electrochemical cells is configured to provide a heat flux of at least 1500 watts per square meter when the first electrochemical cell has a temperature of 100 degrees Celsius and the substrate has a temperature of 25 degrees Celsius.

* * * * *